US010438568B2

(12) United States Patent
Zhao et al.

(10) Patent No.: US 10,438,568 B2
(45) Date of Patent: Oct. 8, 2019

(54) DISPLAY METHOD, INFORMATION PROCESSING METHOD, ELECTRONIC DEVICE, AND DISPLAY SYSTEM

(71) Applicant: Lenovo (Beijing) Co., Ltd., Beijing (CN)

(72) Inventors: Qian Zhao, Beijing (CN); Hao Chen, Beijing (CN); Junfeng Yu, Beijing (CN); Yuru Jin, Beijing (CN); Haibin Ke, Beijing (CN); Danfeng Zhang, Beijing (CN); Bing Xie, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 1062 days.

(21) Appl. No.: 13/778,774

(22) Filed: Feb. 27, 2013

(65) Prior Publication Data

US 2013/0222722 A1 Aug. 29, 2013

(30) Foreign Application Priority Data

Feb. 27, 2012 (CN) .......................... 2012 1 0048464
Feb. 29, 2012 (CN) .......................... 2012 1 0050675
Mar. 26, 2012 (CN) .......................... 2012 1 0082621

(51) Int. Cl.
*G06F 1/16* (2006.01)
*G06F 3/14* (2006.01)
(Continued)

(52) U.S. Cl.
CPC ........... *G09G 5/36* (2013.01); *G02F 1/13306* (2013.01); *G06F 1/16* (2013.01); *G06F 3/1438* (2013.01);
(Continued)

(58) Field of Classification Search
CPC ........ G09G 5/36; G09G 2356/00; G06F 1/16; G06F 3/1438; G06F 3/1446
See application file for complete search history.

(56) References Cited

U.S. PATENT DOCUMENTS 7,428,142 B1 * 9/2008 Ligtenberg ............ G06F 1/1616
345/157
2005/0068253 A1 3/2005 Bartels
(Continued)

FOREIGN PATENT DOCUMENTS

| CN | 201170897 | 12/2008 |
| CN | 101459724 | 6/2009 |

(Continued)

OTHER PUBLICATIONS

Chinese First Office Action with English Translation for related Application No. 201210048464.0 dated June 30, 2015 (9 pages).

(Continued)

*Primary Examiner* — Andre L Matthews
(74) *Attorney, Agent, or Firm* — Brinks Gilson & Lione; John C. Freeman

(57) ABSTRACT

A display method is applied in a first electronic device and a second electronic device, wherein, the first electronic device includes a first display unit having a plurality of edges, and the second electronic device includes a second display unit also having a plurality of edges. The method includes the first electronic device and the second electronic device are tiled and placed in alignment, with a first edge as a first tiling shaft; a predetermined display content is displayed on the first display unit and the second display unit after tiling; when the first electronic device and/or the second electronic device is/are changed in position and re-tiled, a second edge is re-determined as a second tiling shaft; and according to the second tiling shaft, a third display (Continued)

content is displayed on the first display unit, and a fourth display content is displayed on the second display unit.

11 Claims, 22 Drawing Sheets

(51) Int. Cl.
    *G09G 5/36*     (2006.01)
    *G02F 1/133*     (2006.01)

(52) U.S. Cl.
    CPC ....... *G06F 3/1446* (2013.01); *G09G 2356/00* (2013.01)

(56) References Cited

U.S. PATENT DOCUMENTS

| | | | |
|---|---|---|---|
| 2010/0064244 A1 | 3/2010 | Kilpatrick, II | |
| 2011/0252317 A1* | 10/2011 | Keranen | G06F 3/04883 715/702 |
| 2012/0013562 A1 | 1/2012 | Jyonoshita | |
| 2012/0050135 A1* | 3/2012 | Glen | G06F 3/1446 345/1.1 |
| 2012/0062475 A1 | 3/2012 | Locker | |
| 2012/0206319 A1* | 8/2012 | Lucero | H04N 21/4788 345/1.3 |

FOREIGN PATENT DOCUMENTS

| | | |
|---|---|---|
| CN | 102150095 | 8/2011 |
| CN | 102222493 | 10/2011 |

OTHER PUBLICATIONS

First Office Action dated Aug. 25, 2015 out of Chinese priority Application No. 201210082621.X (13 pages including English translation).

First Office Action dated Jun. 30, 2015 out of Chinese priority Application No. 201210048464.0 (17 pages including English translation).

* cited by examiner

DISPLAY METHOD, INFORMATION PROCESSING METHOD, ELECTRONIC DEVICE, AND DISPLAY SYSTEM

This application claims priority to Chinese patent application No. CN 201210048464.0 filed on Feb. 27, 2012; CN 201210050675.8 filed on Feb. 29, 2012 and CN 201210082621.X filed on Mar. 26, 2012 the entire contents of each are incorporated herein by reference.

The present invention relates to the field of electronic devices, and more particularly, relates to a display method, an information processing method, an electronic device, and a display system.

BACKGROUND

Nowadays, electronic devices (such as a Pad) having a flat-panel display are increasingly common. Therefore, users owning such electronic devices expect to be able to interact with each other by means of their respective flat-panel displays. For example, two Pads are tiled together to form a larger-area screen and have an image, text content, movie, etc. displayed on the tiled screen, in which, by way of example, each Pad displays a half content, and the halves content are tiled together to form the original content to be displayed. However, in some cases, there may exist problems: as an example, in the case where two Pads have been tiled to display an image, if one of the Pads is taken away and put back with a 180-degree rotation, then the rotated image can not automatically rotate according to a proximate edge. At this time, it resultantly failures in displaying a content as desired.

In addition, when using a plurality of electronic devices together to play a same video file, audio-signal processing is always a challenge. Because audio signals in a video file generally comprise left-channel audio signals and right-channel audio signals, whereas an electronic device may have a plurality of audio output units, it is quite an urgent problem to solve how to control the audio output units to output audio signals correctly.

Further, many electronic devices (such as flip phones, Tablet PCs or notebook computers) are also equipped with an auxiliary display screen, in addition to a main display screen. Here, the auxiliary display screen may display a whole or a part of the information displayed on the main display screen, or may substitute the main display screen to display various information when the main display screen does not work. At present, electronic devices equipped with dual display screens are typically manufactured to have the two separate display screens back-to-back bonded. In this case, as known in the prior art, for a configuration of dual display screens, two separate sets of light source and backlight systems are required, so as to provide backlight luminance for the two independent display screens, thereby resulting in the thickness and weight of the dual display screens being twice times that of a single display screen. In this case, it is difficult to control the overall thickness and weight of the electronic device having two display screens.

Therefore, it is desired that a content to be displayed can be automatically adjusted according to different proximate edges of an electronic device and audio output units can be properly controlled to output audio signals, while controlling an overall thickness and weight of an electronic device having two display screens.

SUMMARY

One embodiment of the present invention provides a display method, applied in a plurality of electronic devices, the plurality of electronic devices comprising at least a first electronic device and a second electronic device, wherein, the first electronic device comprises a first display unit having a plurality of edges, and the second electronic device comprises a second display unit also having a plurality of edges, the method comprising:

The first electronic device and the second electronic device are tiled and placed in alignment, with a first edge of the plurality of edges of the first display unit as a first tiling shaft;

A predetermined display content is displayed on the first display unit and the second display unit after tiling, wherein, a first display content is displayed on the first display unit, and a second display content is displayed on the second display unit; both the first display content and the second display content are parts of the predetermined display content, moreover, the first display content and the second display content are tiled at the first tiling shaft into the predetermined display content;

When the first electronic device and/or the second electronic device is/are changed in position and re-tiled, a second edge of the plurality of edges of the first display unit is re-determined as a second tiling shaft; and According to the re-determined second tiling shaft, a third display content is displayed on the first display unit, and a fourth display content is displayed on the second display unit, wherein, both the third display content and the fourth display content are parts of the predetermined display content, moreover, the third display content and the fourth display content are tiled at the second tiling shaft into the predetermined display content.

Preferably, the first edge and the second edge may be the same edge.

In this case, preferably, the third display content is the same as the first display content, and the fourth display content is the same as the second display content; moreover, the third display content and the fourth display content have the same display direction with respect to the first electronic device and the second electronic device.

Preferably, the third display content is the same as the second display content, and the fourth display content is the same as the first display content; however, the fourth display content has a different display direction with respect to the second electronic device.

Preferably, the third display content is the same as the first display content, and the fourth display content is the same as the second display content; however, the third display content and the fourth display content have different display directions with respect to the first electronic device and the second electronic device, respectively.

Alternatively, the first edge and the second edge may be different edges.

In this case, preferably, the third display content is the same as the second display content, and the fourth display content is the same as the first display content; moreover, the third display content and the fourth display content have the same display direction with respect to the first electronic device and the second electronic device.

Preferably, the third display content is the same as the first display content, and the fourth display content is the same as the second display content; however, the third display content has a different display direction with respect to the first electronic device.

Preferably, the third display content is the same as the second display content, and the fourth display content is the same as the first display content; however, the fourth display content has a different display direction with respect to the second electronic device.

Preferably, the third display content is the same as the second display content, and the fourth display content is the same as the first display content; however, the third display content has a different display direction with respect to the first electronic device.

Preferably, an edge to be a tiling shaft is determined by proximate-edge sensors provided on every edge of the first display unit and the second display unit.

According to another embodiment of the present invention, there is provided a display system, comprising:

At least one first electronic device, wherein, the first electronic device comprises a first display unit having a plurality of edges, and the first electronic device comprises a first control unit controlling the operation of the first electronic device;

At least one second electronic device, wherein, the second electronic device comprises a second display unit also having a plurality of edges, and the second electronic device comprises a second control unit controlling the operation of the second electronic device;

Wherein, the first control unit and the second control unit are configured to work as follows: when one of the first electronic devices and one of the second electronic devices are tiled and placed in alignment, with a first edge of the plurality of edges of the first display unit as a first tiling shaft, a predetermined display content is displayed on the first display unit and the second display unit after tiling, wherein, a first display content is displayed on the first display unit, and a second display content is displayed on the second display unit; both the first display content and the second display content are parts of the predetermined display content, moreover, the first display content and the second display content are tiled at the first tiling shaft into the predetermined display content;

When the first electronic device and/or the second electronic device is/are changed in position and re-tiled, a second edge of the plurality of edges of the first display unit is re-determined as a second tiling shaft; and According to the re-determined second tiling shaft, a third display content is displayed on the first display unit, and a fourth display content is displayed on the second display unit, wherein, both the third display content and the fourth display content are parts of the predetermined display content, moreover, the third display content and the fourth display content are tiled at the second tiling shaft into the predetermined display content.

According to another embodiment of the present invention, there is provided a display method, applied in a first electronic device which comprises a first display unit having a plurality of edges, the method comprising:

The first electronic device and a second electronic device are tiled and placed in alignment, with a first edge of the plurality of edges of the first display unit as a first tiling shaft, wherein, the second electronic device comprises a second display unit also having a plurality of edges;

A predetermined display content is displayed on the first display unit and the second display unit after tiling, wherein a first part of the predetermined display content is displayed on the first display unit;

After the first electronic device and/or the second electronic device is/are changed in position and re-tiled, a second part of the predetermined display content is displayed on the first display unit.

Preferably, the first part and the second part are the same; moreover, the second part has a same display direction with respect to the first electronic device.

Preferably, the first part and the second part are the same; however, the second part has a different display direction with respect to the first electronic device.

Alternatively, the first part and the second part may be different.

Preferably, an edge to be a tiling shaft is determined by proximate-edge sensors provided on every edge of the first display unit.

According to another embodiment of the present invention, there is provided an electronic device, comprising:

A first display unit having a plurality of edges;

A control unit, configured to work as follows: when the electronic device and a second electronic device are tiled and placed in alignment, with a first edge of the plurality of edges of the first display unit as a first tiling shaft, wherein the second electronic device comprises a second display unit also having a plurality of edges, a predetermined display content is displayed on the first display unit and the second display unit after tiling, wherein, a first part of the predetermined display content is displayed on the first display unit, and after the electronic device and/or the second electronic device is/are changed in position and re-tiled, a second part of the predetermined display content is displayed on the first display unit.

According to another embodiment of the present invention, there is provided an information processing method, applied in a first electronic device, wherein, the first electronic device has a plurality of edges, a first display unit, as well as one or a plurality of first audio output units;

The first electronic device further has a sensing unit for judging whether or not the plurality of edges of the first electronic device abut an external object;

The first electronic device further has a processing unit;

Characterized in that, the information processing method comprises:

The first electronic device and at least one second electronic device abut each other;

It is judged whether or not any one of the plurality of edges of the first electronic device abut the second display unit of the second device;

If one or more edges of the plurality of edges of the first electronic device abut the second display unit, then it is further judged whether or not the one or more edges abutting the second display unit are provided with the first audio output unit(s) thereon;

When the one or more edges abutting the second display unit are provided with the first audio output unit thereon, the audio output of the first audio output unit(s) provided on the one or more edges abutting the second display unit is cancelled.

Preferably, the second electronic device has at least a second display unit and one or a plurality of second audio output units;

The first display unit and the second display unit cooperate, in order to expand the display region and play a multimedia file in the expanded display region;

Wherein, the first display unit displays a part of a picture presented by the multimedia file, and the second display unit displays the other part of the picture presented by the multimedia file.

Preferably, the first electronic device has a first long edge, a second long edge, a first short edge and a second short edge, both the first short edge and the second short edge being provided with the first audio output unit(s) thereon;

the second electronic device has a third long edge, a fourth long edge, a third short edge and a fourth short edge, both the third short edge and the fourth short edge being provided with the second audio output unit(s) thereon; when the first electronic device and the second electronic device are tiled to each other with the second short edge and the third short edge, The step that the audio output of the first audio output unit(s) provided on the one or more edges abutting the second display unit is cancelled, comprises:

The audio output of the first audio output unit(s) provided on the second short edge is cancelled;

The method further comprises: the audio output of the second audio output unit(s) provided on the third short edge is cancelled.

According to another embodiment of the present invention, there is provided an information processing method, applied in a first electronic device, wherein, the first electronic device has a plurality of edges, a first display unit, as well as one or a plurality of first audio output units;

The first electronic device further has a processing unit;

Characterized in that, the information processing method comprises:

The first electronic device and at least one second electronic device abut each other;

The second electronic device has at least a second display unit and one or a plurality of second audio output units;

The first display unit and the second display unit cooperate, in order to expand the display region and play a multimedia file in the expanded display region;

Wherein, the first display unit displays a part of a picture presented by the multimedia file, and the second display unit displays the other part of the picture presented by the multimedia file;

The presented picture has a centerline on the expanded display region;

The presented picture is divided by the centerline into a left-side picture and a right-side picture;

A combination of the left-side picture and the right-side picture makes a viewer can see the presented and positive picture;

The processing unit detects whether the part of the presented picture displayed on the first display unit belongs to the left-side picture or the right-side picture;

If a part of the presented picture displayed on the first display unit belongs to a part of the left-side picture, then at least one of the plurality of first audio output units outputs left-channel audio signals;

If a part of the presented picture displayed on the first display unit belongs to a part of the right-side picture, then at least one of the plurality of first audio output units outputs right-channel audio signals.

Preferably, the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon; when the first electronic device and the second electronic device are tiled to each other with the second short edge and the third short edge, moreover, the first display unit displays the left-side picture of the video image, and the second display unit displays the right-side picture of the video image, The step that at least one of the plurality of first audio output units outputs left-channel audio signals, comprises:

The first audio output unit(s) located on the first short edge outputs left-channel audio signals;

Further comprises: the second audio output unit(s) located on the fourth short edge outputs right-channel audio signals.

Preferably, the method further comprises:

The audio-signal output of the first audio output unit(s) located on the second short edge and the audio-signal output of the second audio output unit(s) located on the third short edge, are shielded.

Preferably, the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon; when the first electronic device and the second electronic device are tiled to each other with the second long edge and the third long edge, moreover, the first display unit displays the left-side picture of the video image, and the second display unit displays the right-side picture of the video image, The step that at least one of the plurality of first audio output units outputs left-channel audio signals, comprises:

The first audio output unit(s) located on the first short edge and the second short edge outputs left-channel audio signals;

Further comprises: the second audio output unit(s) located on the third short edge and the fourth short edge outputs right-channel audio signals.

According to another embodiment of the present invention, there is provided an electronic device, the electronic device is a first electronic device, wherein, the first electronic device has a plurality of edges, a first display unit, as well as one or a plurality of first audio output units;

The first electronic device further has a sensing unit for judging whether or not the plurality of edges of the first electronic device abut an external object;

The first electronic device further has a processing unit;

Characterized in that, the first electronic device further comprises:

A first judging unit, used to judge whether or not any one of the plurality of edges of the first electronic device abut the second display unit of the second device;

A second judging unit, used to: further judge whether or not the one or more edges abutting the second display unit are provided with the first audio output unit(s) thereon, when the judgment result of the first judging unit is YES;

A first audio output canceling unit, used to: cancel the audio output of the first audio output unit(s) provided on the one or more edges abutting the second display unit, when the judgment result of the second judging unit is YES.

According to another embodiment of the present invention, there is provided an electronic device, the electronic device is a first electronic device, wherein, the first electronic device has a plurality of edges, a first display unit, as well as one or a plurality of first audio output units;

Characterized in that, the first electronic device and at least one second electronic device abut each other;

The second electronic device has at least a second display unit and one or a plurality of second audio output units;

The first display unit and the second display unit cooperate, in order to expand the display region and play a multimedia file in the expanded display region;

Wherein, the first display unit displays a part of a picture presented by the multimedia file, and the second display unit displays the other part of the picture presented by the multimedia file;

The presented picture has a centerline on the expanded display region;

The presented picture is divided by the centerline into a left-side picture and a right-side picture;

A combination of the left-side picture and the right-side picture makes a viewer can see the presented and positive picture;

The first electronic device further comprises:

A processing unit, used to: detect whether the part of the presented picture displayed on the first display unit belongs to the left-side picture or the right-side picture;

A left-channel audio-signal output control unit, used to: control at least one of the plurality of first audio output units to output left-channel audio signals, when a part of the presented picture displayed on the first display unit belongs to a part of the left-side picture;

A right-channel audio-signal output control unit, used to: control at least one of the plurality of first audio output units to output right-channel audio signals, when a part of the presented picture displayed on the first display unit belongs to a part of the right-side picture.

According to another embodiment of the present invention, there is provided an electronic device, comprising:

A first liquid crystal display panel;

A second liquid crystal display panel, provided opposite to the first liquid crystal display panel, wherein a cavity having a preset height is between the first liquid crystal display panel and the second liquid crystal display panel;

A light source, provided at one side of the cavity, and configured to emit light;

A first collimating-reflective polarizer film, provided on a first surface of the first liquid crystal display panel, and configured to: make the light emitted by the light source uniformly scattered in the cavity; and A second collimating-reflective polarizer film, provided on a second surface of the second liquid crystal display panel, and configured to: make the light emitted by the light source uniformly scattered in the cavity, wherein, the first surface and the second surface are light incident surfaces of the first liquid crystal display panel and the second liquid crystal display panel, respectively; and A control unit, configured to: receive a display-mode control signal, and based on the display-mode control signal, control displays of the first liquid crystal display panel and the second liquid crystal display panel.

Preferably, if the display-mode control signal indicates that only the first liquid crystal display panel is needed to display a picture, then the control unit provides a full-black signal to the second liquid crystal display unit or interrupts the power supply of the second liquid crystal display unit; and If the display-mode control signal indicates that only the second liquid crystal display panel is needed to display a picture, then the control unit provides a full-black signal to the first liquid crystal display unit or interrupts the power supply of the first liquid crystal display unit.

Preferably, the electronic device further comprises:

A reflective sheet, provided in the cavity, and able to move in a reciprocating manner along a thickness direction of the cavity;

A displacement sensor, configured to: move the reflective sheet, based on the control signal of the control unit.

Preferably, the reflective sheet is made of a material with a high reflectivity; and The reflecting sheet has an area greater than or equal to area of the first liquid crystal display unit or the second liquid crystal display unit.

Preferably, If the display-mode control signal indicates that only the first liquid crystal display panel is needed to display a picture, then the control unit controls the displacement sensor to superimpose the reflective sheet to the second liquid crystal display panel; and If the display-mode control signal indicates that only the second liquid crystal display panel is needed to display a picture, then the control unit controls the displacement sensor to superimpose the reflective sheet to the first liquid crystal display panel.

Preferably, if the display-mode control signal indicates that both the first liquid crystal display panel and the second liquid crystal display panel are needed to display pictures simultaneously, then the control unit controls the displacement sensor to move the reflective sheet to an intermediate portion of the cavity.

Accordingly, with the display method, the electronic device and the display system provided by the embodiments of the present invention, it is achieved that a content to be displayed can be automatically adjusted according to a proximate edge of an electronic device and audio output units can be properly controlled to output audio signals, while controlling an overall thickness and weight of an electronic device having two display screens.

DETAILED DESCRIPTION

Hereinafter, preferred embodiments of the present invention are described in detail with reference to the accompanying drawings.

<The First Embodiment>

Figure 1:
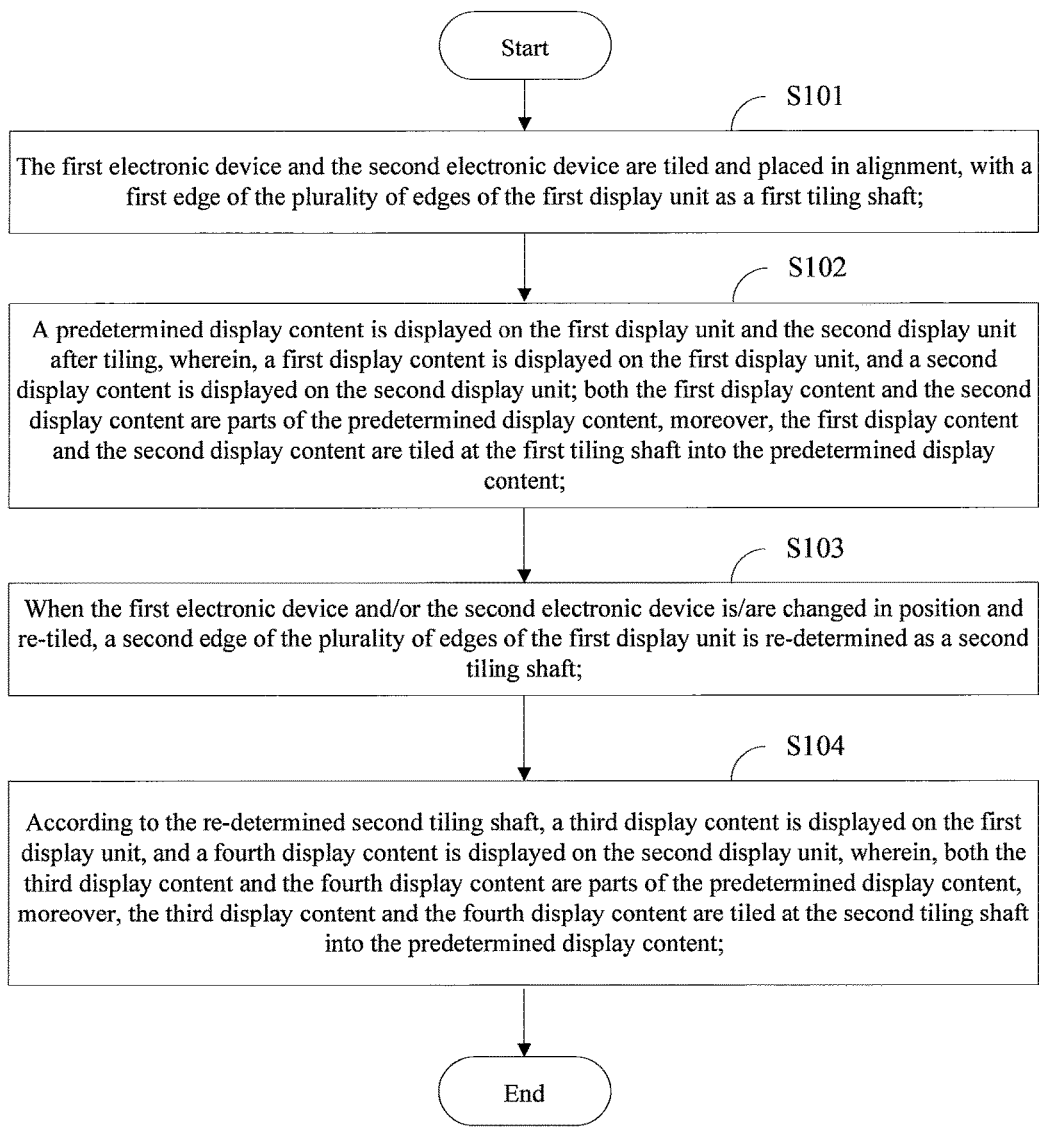
FIG. 1 illustrates a flowchart of a display method in accordance with a first embodiment of the present invention.

First, with reference to FIG. 1, a display method in accordance with a first embodiment of the present invention will be described. FIG. 1 is a flowchart, depicting the display method in accordance with the first embodiment of the present invention. The display method in accordance with this embodiment can be applied in electronic devices, such as Pads, smart phones, notebooks, and the like, which comprise a flat-panel display.

As shown in FIG. 1, the display method in accordance with this embodiment of the invention is applied in a plurality of electronic devices, the plurality of electronic devices comprising at least a first electronic device and a second electronic device, wherein, the first electronic device comprises a first display unit having a plurality of edges, and the second electronic device comprises a second display unit also having a plurality of edges, the method 100 comprising:

Step S101: The first electronic device and the second electronic device are tiled and placed in alignment, with a first edge of the plurality of edges of the first display unit as a first tiling shaft.

In this step, the first electronic device and the second electronic device expected to be tiled, are placed in alignment and tiled with one edge of the first display unit as a tiling shaft; by way of example, when the first display unit is rectangular, it may be assumed that a long edge as a first edge and a short edge as a second edge; in this embodiment, a long edge is used as a first tiling shaft for placing in alignment. Certainly, it is also possible to use a short edge of the first display unit as a tiling shaft for placing in alignment. Preferably, edges having a same length in the first electronic device and the second electronic device are used for tiling.

Step S102: A predetermined display content is displayed on the first display unit and the second display unit after tiling, wherein, a first display content is displayed on the first display unit, and a second display content is displayed on the second display unit; both the first display content and the second display content are parts of the predetermined display content, moreover, the first display content and the second display content are tiled at the first tiling shaft into the predetermined display content.

In this step, the first display unit and the second display unit after tiling are used as a whole, to display a predetermined display content (such as images, text content, movies, etc.). At this time, according to a predefined rule, the predetermined display content may be divided into a first display content and a second display content. For example, the predetermined display content is divided by the ratio of 1:1 into a first display content and a second display content. Certainly, it is also possible to be divided by the ratio of 1:2 or 2:1, etc., and the predefined rule may be set by users themselves. In this embodiment, the first content and the second display content are tiled at a long edge of the first display device into the predetermined display content.

Step S103: When the first electronic device and/or the second electronic device is/are changed in position and re-tiled, a second edge of the plurality of edges of the first display unit is re-determined as a second tiling shaft.

In this step, if the first electronic device and/or the second electronic device is/are changed in position and re-tiled, then the tiling edge for the two electronic devices, it is necessary to detect the tiled edges of the two electronic devices, for determining which edge of the first display unit and the second display unit is the tiling shaft.

Step S104: According to the re-determined second tiling shaft, a third display content is displayed on the first display unit, and a fourth display content is displayed on the second display unit, wherein, both the third display content and the fourth display content are parts of the predetermined display content, moreover, the third display content and the fourth display content are tiled at the second tiling shaft into the predetermined display content.

In this step, according to a re-determined second tiling shaft, the predetermined display content may be divided by the same predefined rule as set previously, into a third display content and a fourth display content. For example, likewise, the predetermined display content is divided by the ratio of 1:1 into a third display content and a fourth display content. Alternatively, it is divided by the ratio of 1:2 or 2:1, etc. Then, the third content and the fourth display content can be tiled at the second tiling shaft into the predetermined display content.

In this embodiment, there may exist several cases as follows, in which the first electronic device and/or the second electronic device are changed in position; also in this embodiment, processing schemes are provided respectively for each case.

1. The first edge and the second edge are the same edge.

That is, for the first electronic device, the edge for tiling with the second electronic device is not changed, and in this embodiment, it is still the long edge. However, the second electronic device may have several position states as follows.

1-1. The tiling edge of the first electronic device is not changed, and the tiling edge of the second electronic device is not changed.

Figure 2:
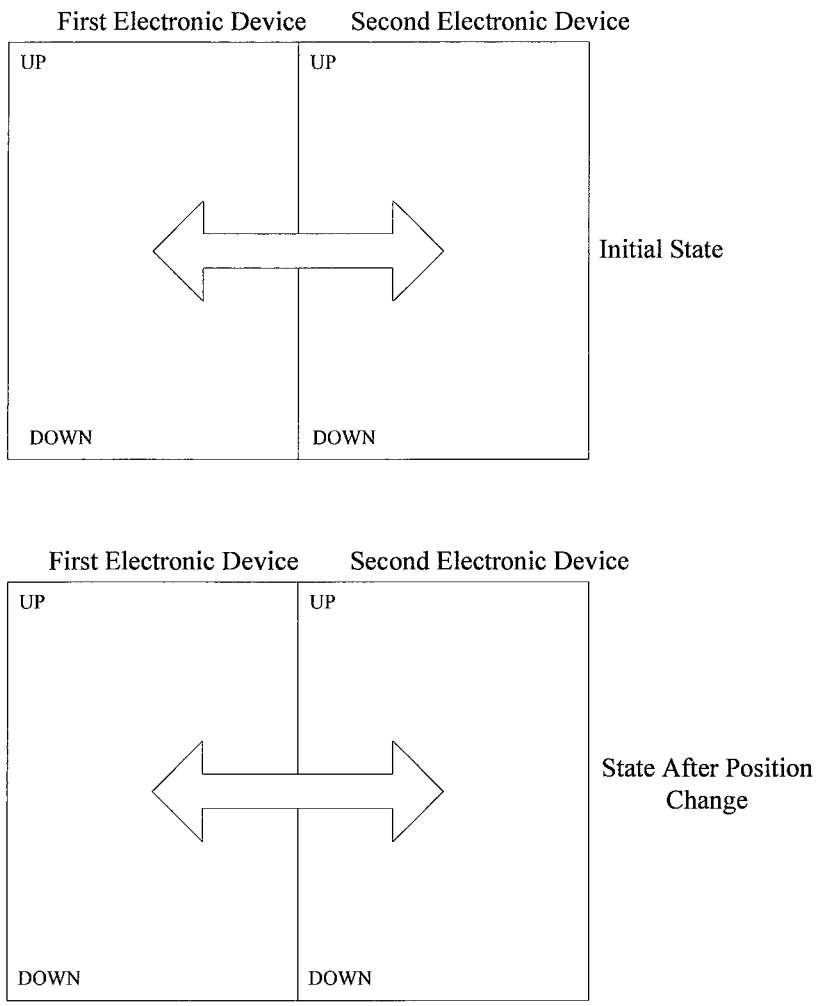
FIG. 2 illustrates a first state of the display method in accordance with the first embodiment of the present invention.

Specifically, in this state, the tiling edges of both the first electronic device and the second electronic device are not changed, and this indicates that the first electronic device and/or the second electronic device after movement is/are directly re-tiled again as an original state. At this time, concerning the presented display content after re-tiling, the third display content is the same as the first display content, and the fourth display content is the same as the second display content. In addition, the third display content and the fourth display content have the same display direction with respect to the first electronic device and the second electronic device. That is, the display direction of the third display content with respect to the first electronic device is not changed and same as the first display content; moreover, the display direction of the fourth display content with respect to the second electronic device is not changed and same as the second display content. Such a situation is as shown in FIG. 2.

1-2. The tiling edge of the first electronic device is not changed, whereas the tiling edge of the second electronic device is changed.

Specifically, in this state, the tiling edge of the first electronic device is not changed, whereas the tiling edge of the second electronic device is changed, and this indicates that, the first electronic device is not moved, but the second electronic device after a 180-degree rotation is re-tiled with the first electronic device. At this time, concerning the presented display content after re-tiling, the third display content is the same as the first display content, and the fourth display content is the same as the second display content; however, the fourth display content has a different display direction with respect to the second electronic device. That is, the display direction of the third display content with respect to the first electronic device is not changed, but the display direction of the fourth display content with respect to the second electronic device is changed and contrary to the second display content; that is, for example, the display direction of the original second display content with respect to the second electronic device is a positive direction, then the display direction of the fourth display content with respect to the second electronic device is a reverse direction. Specifically, with reference to the state shown in FIG. 2, at this time, the arrow direction displayed by the second electronic device with respect to the display direction of the second electronic device has been rotated 180 degrees.

1-3. The tiling edge of the first electronic device is changed, and the tiling edge of the second electronic device is also changed.

Figure 3:
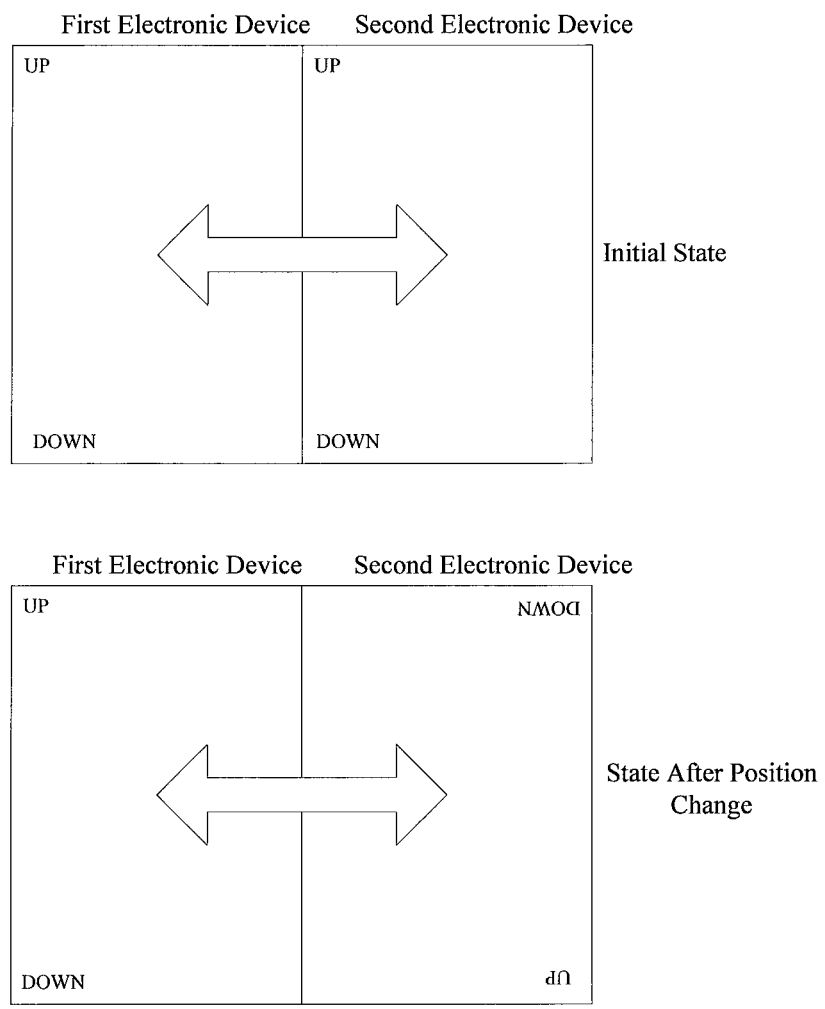
FIG. 3 illustrates a second state of the display method in accordance with the first embodiment of the present invention.
Figure 4:
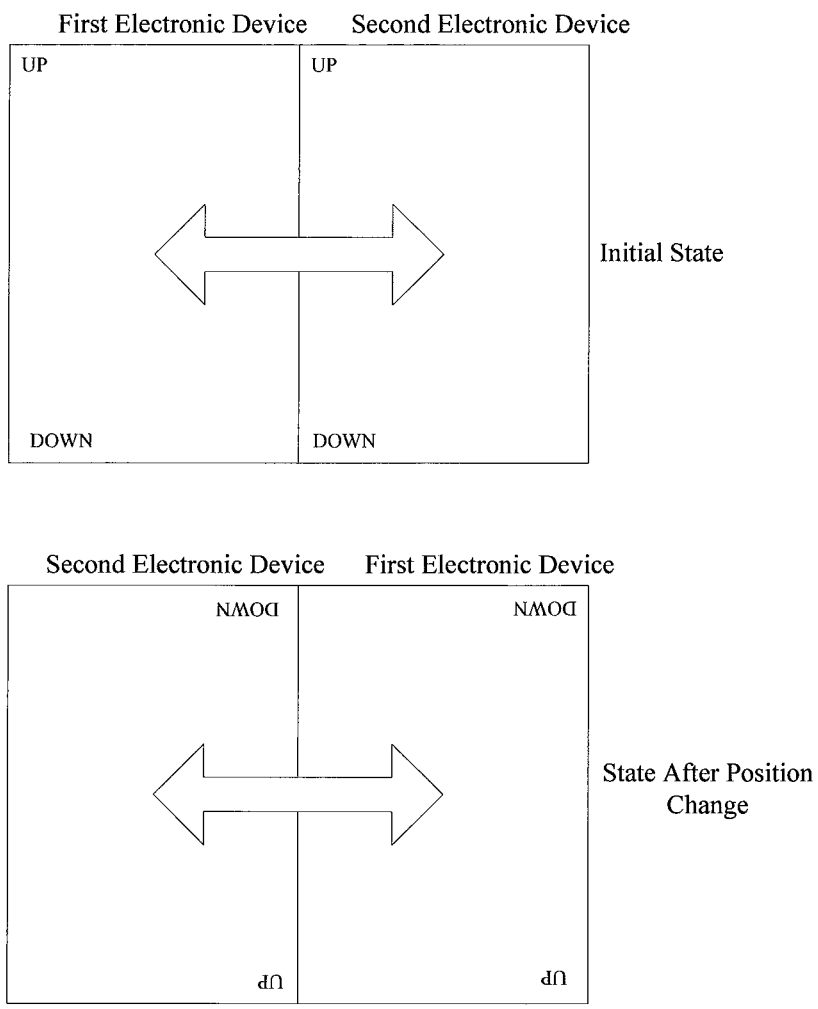
FIG. 4 illustrates a third state of the display method in accordance with the first embodiment of the present invention.

Specifically, in this state, the tiling edge of the first electronic device is changed, and the tiling edge of the second electronic device is also changed; this indicates that, the first electronic device is rotated 180 degrees, and the second electronic device is also rotated 180 degrees and then re-tiled with the first electronic device. At this time, concerning the presented display content after re-tiling, the third display content is the same as the second display content, and the fourth display content is the same as the first display content; however, the third display content has a different display direction with respect to the first electronic device, also the fourth display content has a different display direction with respect to the second electronic device. That is, the display direction of the third display content with respect to the first electronic device is changed and contrary to the second display content; also, the display direction of the fourth display content with respect to the second electronic device is changed and contrary to the first display content. Specifically, with reference to the state shown in FIG. 3, at this time, the arrow direction displayed by the first electronic device with respect to the display direction of the first electronic device has been rotated 180 degrees; moreover, the arrow direction displayed by the second electronic device with respect to the display direction of the second electronic device has also been rotated 180 degrees.

2. The first edge and the second edge are different edges.

That is, for the first electronic device, the edge for tiling with the second electronic device has been changed, and in this embodiment, it is assumed that the tiling edge of the first electronic device is still a long edge, that is, another long edge is used as a tiling shaft. At this time, the second electronic device may have several position states as follows.

Figure 5:
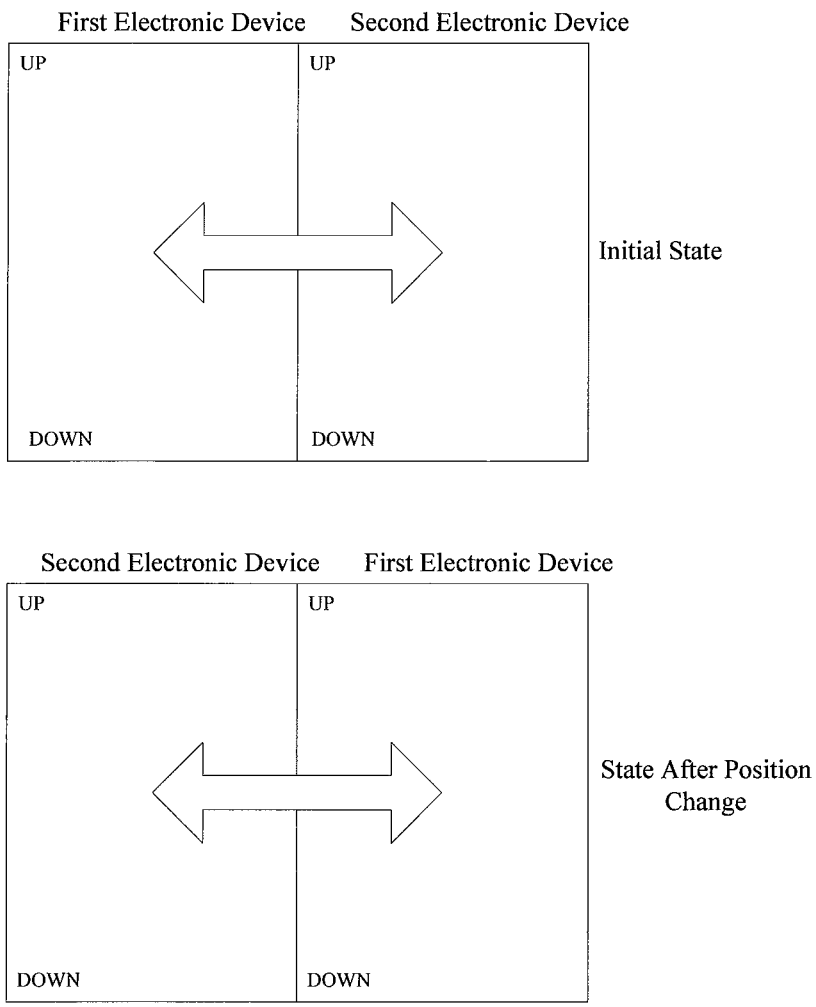
FIG. 5 illustrates a third state of the display method in accordance with the first embodiment of the present invention.

2-1. The third display content is the same as the second display content, and the fourth display content is the same as the first display content; moreover, the third display content and the fourth display content have the same display direction with respect to the first electronic device and the second electronic device. Such a situation is as shown in FIG. 5.

At this time, it is equivalent to that the first electronic device and the second electronic device are exchanged in position; that is, at this time, the content displayed on the first electronic device is the same as the content originally displayed on the second electronic device, and the content displayed on the second electronic device is the same as the content originally displayed on the first electronic device.

2-2. The third display content is the same as the first display content, and the fourth display content is the same as the second display content; however, the third display content has a different display direction with respect to the first electronic device.

Figure 6:
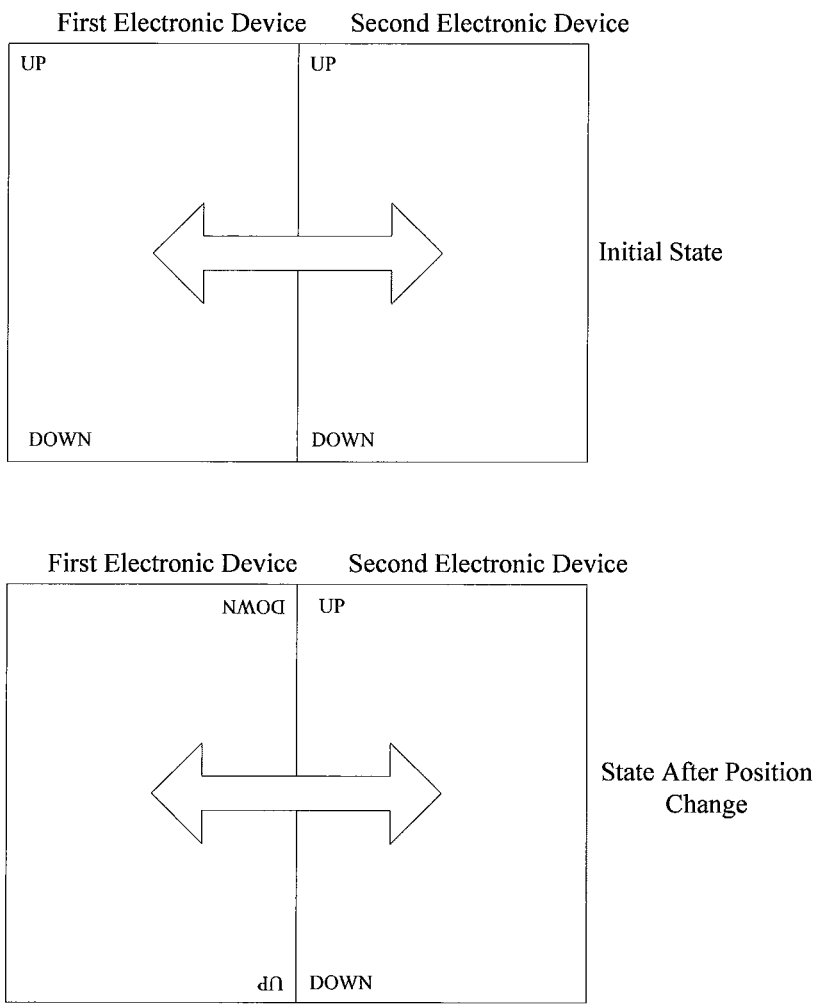
FIG. 6 illustrates a third state of the display method in accordance with the first embodiment of the present invention.

At this time, it is equivalent to the situation that the first electronic device is rotated 180 degrees whereas the second electronic device is kept unchanged. At this time, the third display content displayed on the first electronic device is the same as the original first display content, but the direction of the third display content is rotated 180 degrees with respect to the first electronic device. Such a situation is as shown in FIG. 6.

2-3. The third display content is the same as the second display content, and the fourth display content is the same as the first display content; however, the fourth display content has a different display direction with respect to the second electronic device.

Figure 7:
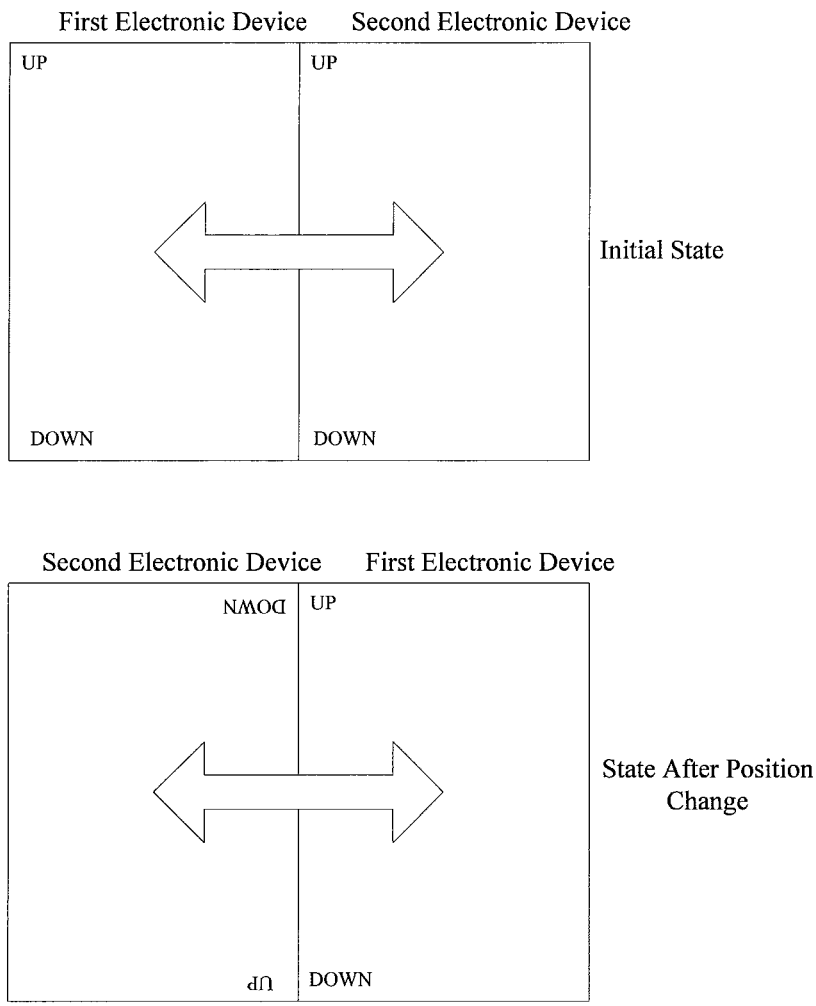
FIG. 7 illustrates a third state of the display method in accordance with the first embodiment of the present invention.

At this time, it is equivalent to that the first electronic device and the second electronic device are exchanged in position, while the second electronic device is further rotated 180 degrees. Such a situation is as shown in FIG. 7.

2-4. The third display content is the same as the second display content, and the fourth display content is the same as the first display content; however, the third display content has a different display direction with respect to the first electronic device.

Figure 8:
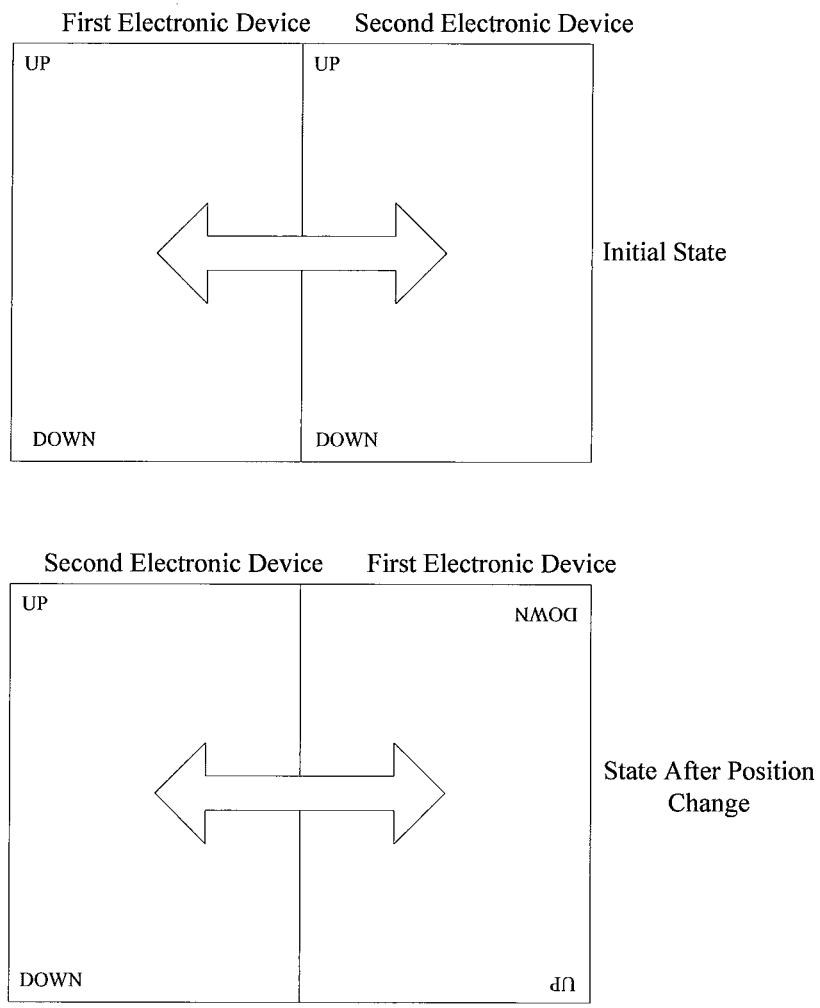
FIG. 8 illustrates a third state of the display method in accordance with the first embodiment of the present invention.

At this time, it is equivalent to that the first electronic device and the second electronic device are exchanged in position, while the first electronic device is further rotated 180 degrees. Such a situation is as shown in FIG. 8.

The above is a description of several cases where the first electronic device and the second electronic device are changed in position. In addition, for the first electronic device and the second electronic device, edges as tiling shafts may be determined by proximate-edge sensors provided on every edge of the first display unit and the second display unit. There are many methods for proximate-edge detection; by way of example, by providing Hall elements and magnets on every edge of the display units, two approaching edges can be determined by Hall-sensor signals which are generated when two edges approaches each other.

After a proximate edge is determined as a tiling shaft by proximate-edge sensors, the first electronic device and the second electronic device implement calculation and control with their own control units, respectively, so that a predetermined display content is divided according to a predefined rule, and displayed on the first display unit and the second display unit, respectively, thereby tiling into a complete predetermined display content.

With the display method provided by this embodiment of the present invention, it is achieved that a content to be displayed can be automatically adjusted according to a proximate edge of an electronic device, thereby effectively improving user experience.

Figure 9:
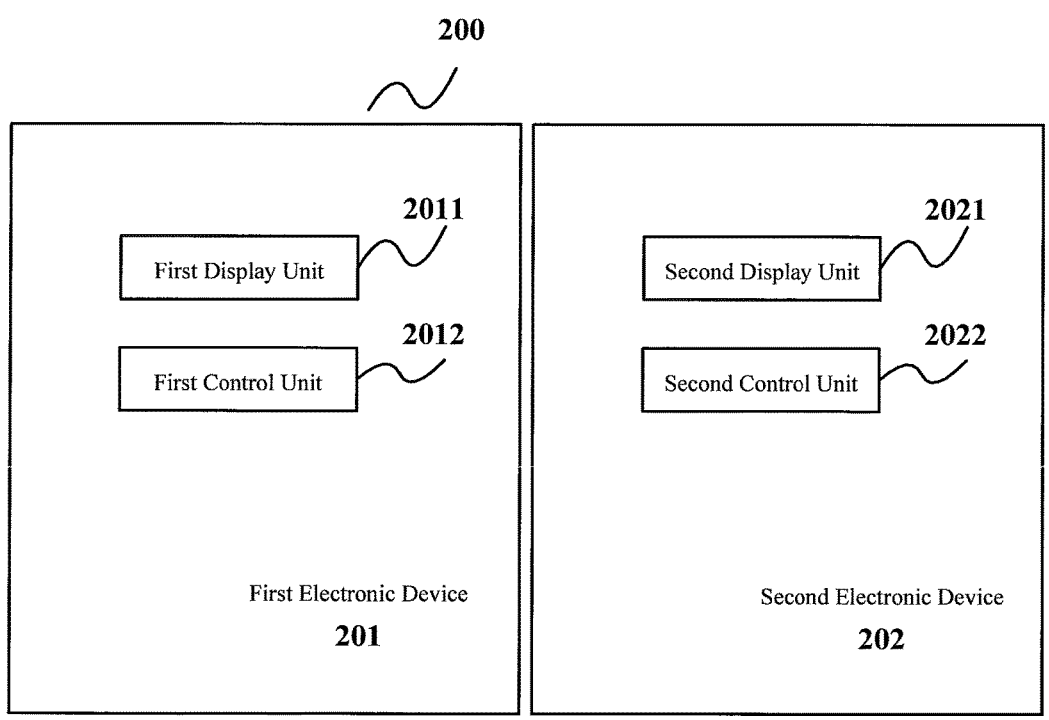
FIG. 9 illustrates a block diagram of a display system in accordance with the first embodiment of the present invention.

Below, with reference to FIG. 9, a display system in accordance with an embodiment of the present invention will be described.

A display system 200 in accordance with an embodiment of the present invention, comprising:

At least one first electronic device 201, wherein, the first electronic device 201 comprises a first display unit 2011 having a plurality of edges, and the first electronic device 201 comprises a first control unit 2012 controlling the operation of the first electronic device 201;

At least one second electronic device 202, wherein, the second electronic device 202 comprises a second display unit 2021 also having a plurality of edges, and the second electronic device 202 comprises a second control unit 2022 controlling the operation of the second electronic device 202;

Wherein, the first control unit 2012 and the second control unit 2022 are configured to work as follows: when one of the first electronic devices 201 and one of the second electronic devices 202 are tiled and placed in alignment, with a first edge of the plurality of edges of the first display unit 2011 as a first tiling shaft, a predetermined display content is displayed on the first display unit 2011 and the second display unit 2021 after tiling, wherein, a first display content is displayed on the first display unit 2011, and a second display content is displayed on the second display unit 2021; both the first display content and the second display content are parts of the predetermined display content, moreover, the first display content and the second display content are tiled at the first tiling shaft into the predetermined display content;

When the first electronic device 201 and/or the second electronic device 202 is/are changed in position and re-tiled, a second edge of the plurality of edges of the first display unit 2011 is re-determined as a second tiling shaft; and According to the re-determined second tiling shaft, a third display content is displayed on the first display unit 2011, and a fourth display content is displayed on the second display unit 2021, wherein, both the third display content and the fourth display content are parts of the predetermined display content, moreover, the third display content and the fourth display content are tiled at the second tiling shaft into the predetermined display content.

In addition, an edge as a tiling shaft may be determined by proximate-edge sensors (not shown) provided on every edge of the first display unit 2011 of first electronic device 201 and on every edge of the second display unit 2021 of the second electronic device 202.

In addition, a gravity sensor (gyro) may be further provided to the first electronic device and the second electronic device, for detecting screen rotation.

With the display system provided by this embodiment of the invention, it is achieved that a content to be displayed can be automatically adjusted according to a proximate edge of an electronic device, thereby effectively improving user experience.

<The Second Embodiment>

Figure 10:
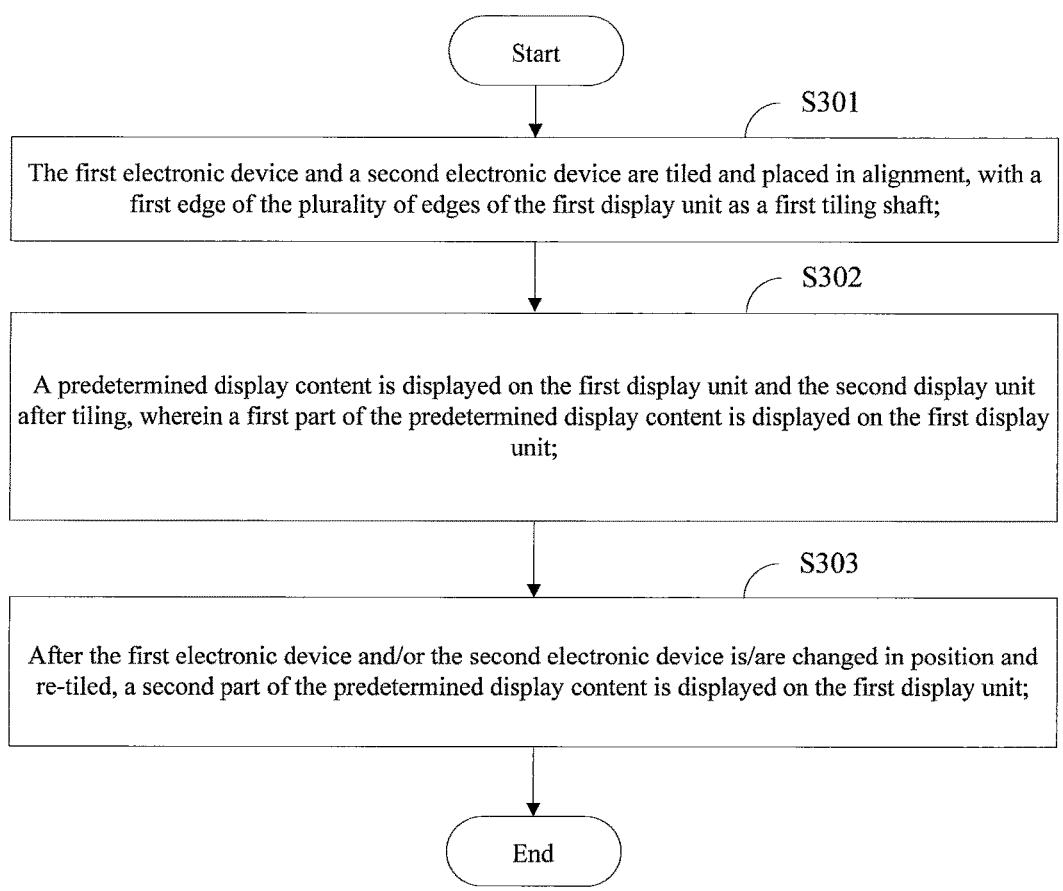
FIG. 10 illustrates a flowchart of a display method in accordance with a second embodiment of the present invention.

Next, with reference to FIG. 10, a display method in accordance with a second embodiment of the present invention will be described. FIG. 10 is a flowchart illustrating a display method in accordance with a second embodiment of the present invention;

The display method in accordance with the second embodiment of the invention is applied in a first electronic device which comprises a first display unit having a plurality of edges, the method 300 comprising:

Step S301: The first electronic device and a second electronic device are tiled and placed in alignment, with a first edge of the plurality of edges of the first display unit as a first tiling shaft, wherein the second electronic device comprises a second display unit also having a plurality of edges.

Like Step S101 in the first embodiment, in this step, the first electronic device and the second electronic device expected to be tiled, are placed in alignment and tiled with one edge of the first display unit as a tiling shaft; by way of example, when the first display unit is rectangular, it may be assumed that a long edge as a first edge and a short edge as a second edge; in this embodiment, a long edge is used as a first tiling shaft for placing in alignment. Certainly, it is also possible to use a short edge of the first display unit as a tiling shaft for placing in alignment. Preferably, edges having a same length in the first electronic device and the second electronic device, are used for tiling.

Step S302: A predetermined display content is displayed on the first display unit and the second display unit after tiling, wherein a first part of the predetermined display content is displayed on the first display unit.

In this step, the first display unit and the second display unit after tiling are used as a whole, to display a predetermined display content (such as images, text content, movies, etc.). At this time, according to a predefined rule, the predetermined display content may be divided into a first display content and a second display content. For example, the predetermined display content is divided by the ratio of 1:1 into a first display content and a second display content. Certainly, it is also possible to be divided by the ratio of 1:2 or 2:1, etc., and the predefined rule may be set by users themselves. In this embodiment, only the first display content is controlled to be displayed on the first display unit.

Step S303: After the first electronic device and/or the second electronic device is/are changed in position and re-tiled, a second part of the predetermined display content is displayed on the first display unit.

In this step, according to a re-determined second tiling shaft, the predetermined display content may be divided by the same predefined rule as set previously, into a third display content and a fourth display content. For example, likewise, the predetermined display content is divided by the ratio of 1:1 into a third display content and a fourth display content. Alternatively, it is divided by the ratio of 1:2 or 2:1, etc. In this embodiment, only the third display content is controlled to be displayed on the first display unit.

In this embodiment, there may exist several cases as follows, in which the first electronic device and/or the second electronic device are changed in position; also in this embodiment, processing schemes are provided respectively for each case.

3-1. The first part and the second part are the same, moreover, the second part has a same display direction with respect to the first electronic device.

At this time, it is the equivalent to that the first electronic device and the second electronic device after movement are directly tiled again.

3-2. The first part and the second part are the same, however, the second part has a different display direction with respect to the first electronic device.

At this time, it is the equivalent to that, the first electronic device and the second electronic device are tiled after movement, while the second electronic device is rotated 180 degrees.

3-3. The first part and the second part are different.

At this time, positions with respect to the first device are also changed; at this time, there are several situations, which are the same as those described above in the first embodiment, and a detailed description thereof is omitted here.

Further, an edge to be a tiling shaft may be determined by proximate-edge sensors provided on every edge of the first display unit.

With the display method provided by this embodiment of the invention, it is achieved that a content to be displayed can be automatically adjusted according to a proximate edge of an electronic device, thereby effectively improving user experience.

Figure 11:
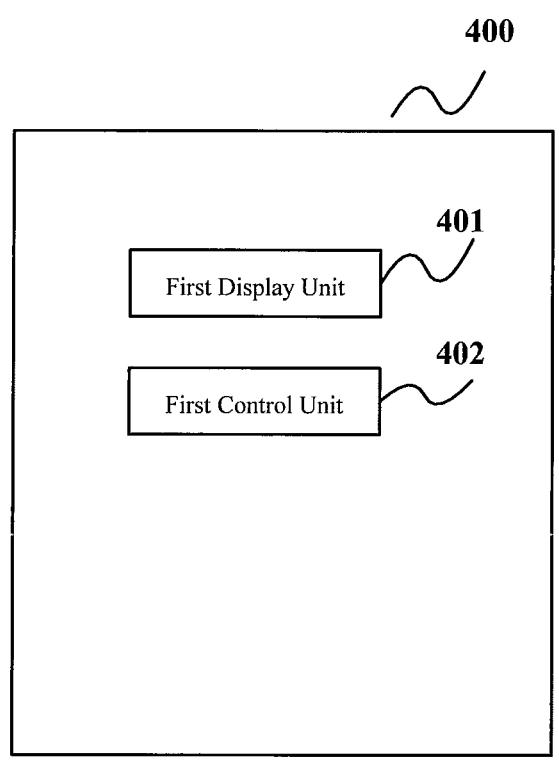
FIG. 11 illustrates an electronic device in accordance with the second embodiment of the present invention.

Below, with reference to FIG. 11, an electronic device in accordance with an embodiment of the present invention will be described.

An electronic device 400 according to an embodiment of the present invention comprises:

A first display unit 401 having a plurality of edges;

A control unit 402, configured to work as follows: when the electronic device and a second electronic device are tiled and placed in alignment, with a first edge of the plurality of edges of the first display unit as a first tiling shaft, wherein the second electronic device comprises a second display unit also having a plurality of edges, a predetermined display content is displayed on the first display unit 401 and the second display unit 402 after tiling, wherein, a first part of the predetermined display content is displayed on the first display unit 401, and after the electronic device and/or the second electronic device is/are changed in position and re-tiled, a second part of the predetermined display content is displayed on the first display unit 402.

In addition, an edge as a tiling shaft may be determined by proximate-edge sensors (not shown) provided on every edge of the first display unit 401 of electronic device 400.

With the electronic device provided by this embodiment of the invention, it is achieved that a content to be displayed can be automatically adjusted according to a proximate edge of an electronic device, thereby effectively improving user experience.

<Embodiment 1>

Figure 12:
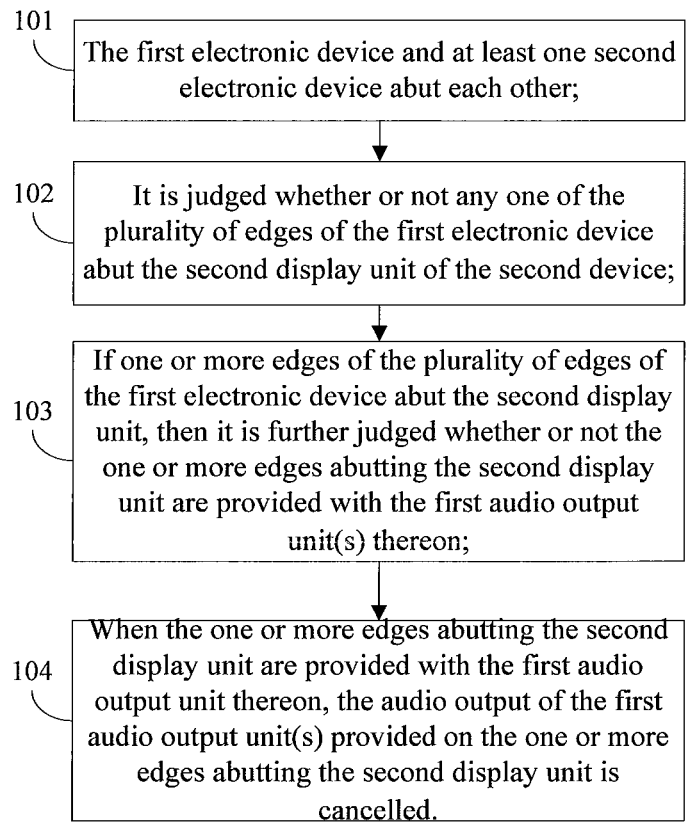
FIG. 12 is a flowchart of an information processing method in accordance with Embodiment 1 of the present invention.

FIG. 12 is a flowchart of an information processing method in accordance with Embodiment 1 of the present invention. As shown in FIG. 12, the method comprises the steps as follows:

101: The first electronic device and at least one second electronic device abut each other;

The first electronic device and the second electronic device may be the same type of electronic device.

102: It is judged whether or not any one of the plurality of edges of the first electronic device abut the second display unit of the second device;

For example, the first electronic device and the second electronic device are the same type, and each of them has two long edges and two short edges. Generally, when one of the plurality of edges of the first electronic device abut the second display unit of the second device, there are two cases as follows:

A long edge of the first electronic device abuts a long edge of the second electronic device;

Alternatively, a short edge of the first electronic device abuts a short edge of the second electronic device.

103: If one or more edges of the plurality of edges of the first electronic device abut the second display unit, then it is further judged whether or not the one or more edges abutting the second display unit are provided with the first audio output unit(s) thereon;

104: When the one or more edges abutting the second display unit are provided with the first audio output unit thereon, the audio output of the first audio output unit(s) provided on the one or more edges abutting the second display unit is cancelled.

Specifically, the second electronic device has at least a second display unit and one or a plurality of second audio output units;

The first display unit and the second display unit cooperate, in order to expand the display region and play a multimedia file in the expanded display region;

Wherein, the first display unit displays a part of a picture presented by the multimedia file, and the second display unit displays the other part of the picture presented by the multimedia file.

Figure 13:
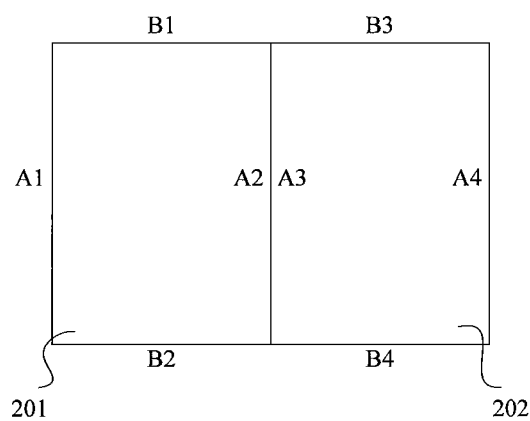
FIG. 13 is a schematic diagram of two electronic devices of the present invention, tiled in a first way to display an image.

FIG. 13 is a schematic diagram of two electronic devices of the present invention, tiled in a first way to display an image. In FIG. 13, the first electronic device 201 has four edges, namely, a first long edge A1, a second long edge A2, a first short edge B1, and a second short edge B2. The second electronic device 202 has four edges, namely, a third long edge A3, a fourth long edge A4, a third short edge B3, and a fourth short edge B4. The second long edge A2 of the first electronic device 201 and the third long edge A3 of the second electronic device 202 abut against each other. At this time, the first electronic device 201 can play left-side pictures of a video file, and the second electronic device 202 can play right-side pictures of the video file. Seen from a user, when two electronic devices are tiled together to play video files or images, the display area is two times that of a single electronic device.

Figure 14:
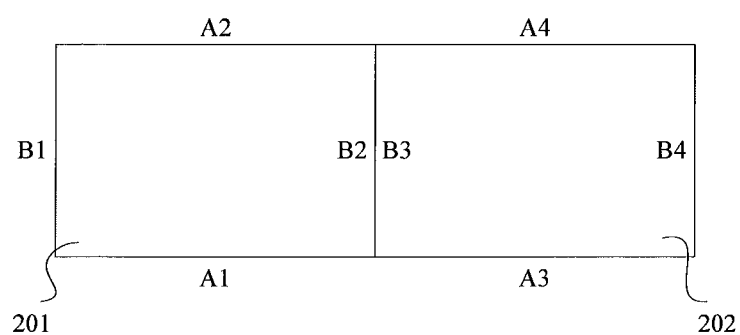
FIG. 14 is a schematic diagram of two electronic devices of the present invention, tiled in a second way to display an image.

FIG. 14 is a schematic diagram of two electronic devices of the present invention, tiled in a second way to display an image. It is different from FIG. 13 in that, in FIG. 14, the second short edge B2 of the first electronic device 201 and the third short edge B3 of the second electronic device 202 abut against each other.

Figure 15:
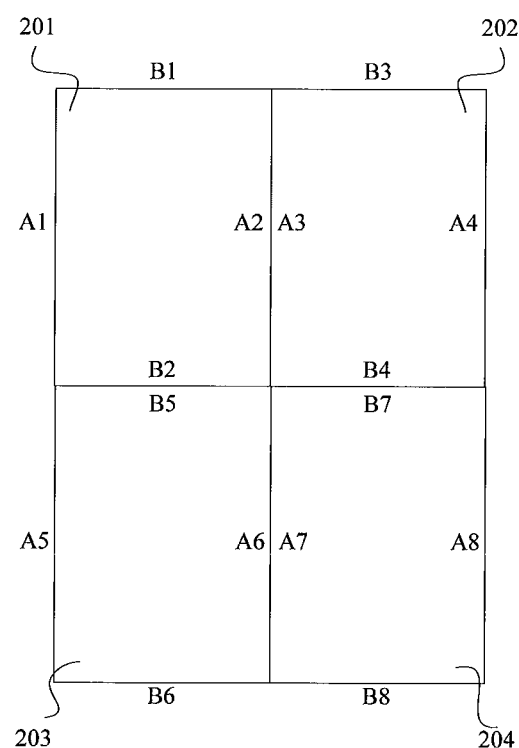
FIG. 15 is a schematic diagram of a plurality of electronic devices of the present invention, tiled together to display an image.

FIG. 15 is a schematic diagram of a plurality of electronic devices of the present invention, tiled together to display an image. In FIG. 15, the first electronic device 201 has four edges, namely, a first long edge A1, a second long edge A2, a first short edge B1, and a second short edge B2. The second electronic device 202 has four edges, namely, a third long edge A3, a fourth long edge A4, a third short edge B3, and a fourth short edge B4. The third electronic device 203 has four edges, namely, a fifth long edge A5, a sixth long edge A6, a fifth short edge B5, and a sixth short edge B6. The fourth electronic device 204 has four edges, namely, a seventh long edge A7, an eighth long edge A8, a seventh short edge B7, and an eighth short edge B8. Of the four devices, there are eight edges, in pairs, abutting against each other, that is, A2, A3, A6, A7, B2, B5, B4 and B7. At this time, the first electronic device 201 can display an upper-left portion of a picture, the second electronic device 202 can display an upper-right portion of the picture, the third electronic device 203 can display a lower-left portion of the picture, and the fourth electronic device 204 can display a lower-right portion of the picture.

If it is assumed that the first long edge A1, the second long edge A2, the third long edge A3 and the fourth long edge A4 are provided with audio output units, then, in correspondence to FIG. 13, the step 104 in this embodiment can be a step to cancel audio output of the audio output units provided on the second long edge A2 and the third long edge A3.

In this embodiment, it is judged whether or not one of the plurality of edges of the first electronic device abuts the second display unit of the second device; if YES, then it is further judged whether or not the one or more edges abutting the second display unit are provided with the first audio output unit(s) thereon; if YES, then the audio output of the first audio output unit(s) provided on the one or more edges abutting the second display unit is cancelled; in this way, when a plurality of electronic devices play a video file together, it can prevent the sound output by the audio output unit(s) at the abutting places from affecting user experience, whereas the audio output unit(s) at non-abutting places can output audio, thereby enhancing user's listening experience.

Embodiment 2

In this embodiment, the first electronic device has a first long edge, a second long edge, a first short edge and a second short edge, of which the first short edge and the second short edge are provided with the first audio output unit; the second electronic device has a third length, a fourth long edge, a third short edge and a fourth short edge, of which the third short edge and the fourth short edge are provided with the second audio output units. This embodiment corresponds to the case, as shown in FIG. 14, that the second short edge B2 of the first electronic device 201 and the third short edge B3 of the second electronic device 202 abut against each other.

Figure 16:
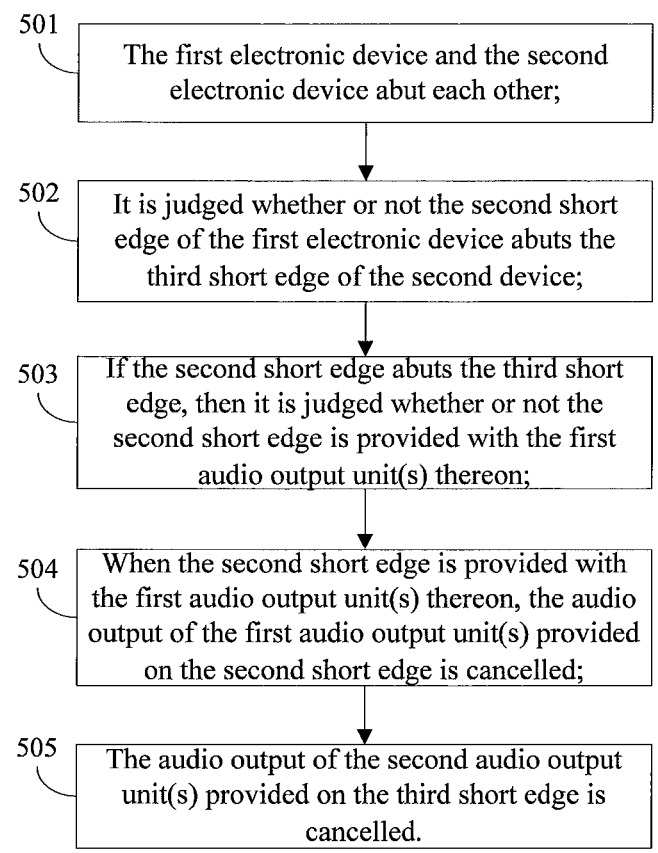
FIG. 16 is a flowchart of an information processing method in accordance with Embodiment 2 of the present invention.

FIG. 16 is a flowchart of an information processing method in accordance with Embodiment 2 of the present invention. As shown in FIG. 16, the method comprises the steps as follows:

501: The first electronic device and the second electronic device abut each other;

502: It is judged whether or not the second short edge of the first electronic device abuts the third short edge of the second device;

503: If the second short edge abuts the third short edge, then it is judged whether or not the second short edge is provided with the first audio output unit(s) thereon;

504: When the second short edge is provided with the first audio output unit(s) thereon, the audio output of the first audio output unit(s) provided on the second short edge is cancelled;

505: The audio output of the second audio output unit(s) provided on the third short edge is cancelled.

Embodiment 3

Figure 17:
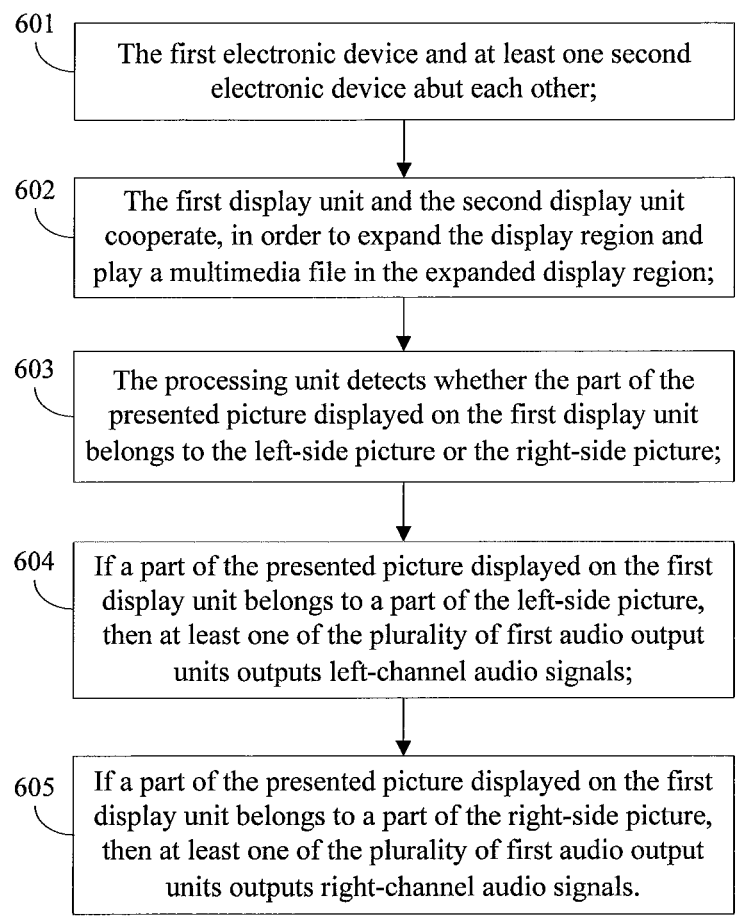
FIG. 17 is a flowchart of an information processing method in accordance with Embodiment 3 of the present invention.

FIG. 17 is a flowchart of an information processing method in accordance with Embodiment 3 of the present invention. As shown in FIG. 17, the method comprises the steps as follows:

601: The first electronic device and at least one second electronic device abut each other;

The second electronic device has at least a second display unit and one or a plurality of second audio output units;

602: The first display unit and the second display unit cooperate, in order to expand the display region and play a multimedia file in the expanded display region;

Wherein, the first display unit displays a part of a picture presented by the multimedia file, and the second display unit displays the other part of the picture presented by the multimedia file;

The presented picture has a centerline on the expanded display region;

The centerline may be formed by the two abutting edges of the first electronic device and the second electronic device.

The presented picture is divided by the centerline into a left-side picture and a right-side picture;

A combination of the left-side picture and the right-side picture makes a viewer can see the presented and positive picture;

603: The processing unit detects whether the part of the presented picture displayed on the first display unit belongs to the left-side picture or the right-side picture;

604: If a part of the presented picture displayed on the first display unit belongs to a part of the left-side picture, then at least one of the plurality of first audio output units outputs left-channel audio signals;

605: If a part of the presented picture displayed on the first display unit belongs to a part of the right-side picture, then at least one of the plurality of first audio output units outputs right-channel audio signals.

In the information processing method according to this embodiment, it is detected whether the part of the presented picture displayed on the first display unit belongs to the left-side picture or the right-side picture; when the first display unit displays a part of the left-side picture, the first audio output unit(s) are controlled to output left-channel audio signals, and when the first display unit displays a part of the right-side picture, the first audio output unit(s) are controlled to output right-channel audio signals; in this way, it is achieved that, the audio output units of the electronic devices used in combination can be controlled, and output proper audio signals in accordance with the pictures displayed by the display units of the electronic devices.

Embodiment 4

In this embodiment, the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon; the first electronic device and the second electronic device are tiled to each other with the second short edge and the third short edge; moreover, the first display unit displays left-side pictures of a video image, and the second display unit displays right-side pictures of the video image. This embodiment corresponds to the case, as shown in FIG. 14, that the second short edge B2 of the first electronic device 201 and the third short edge B3 of the second electronic device 202 abut against each other.

Figure 18:
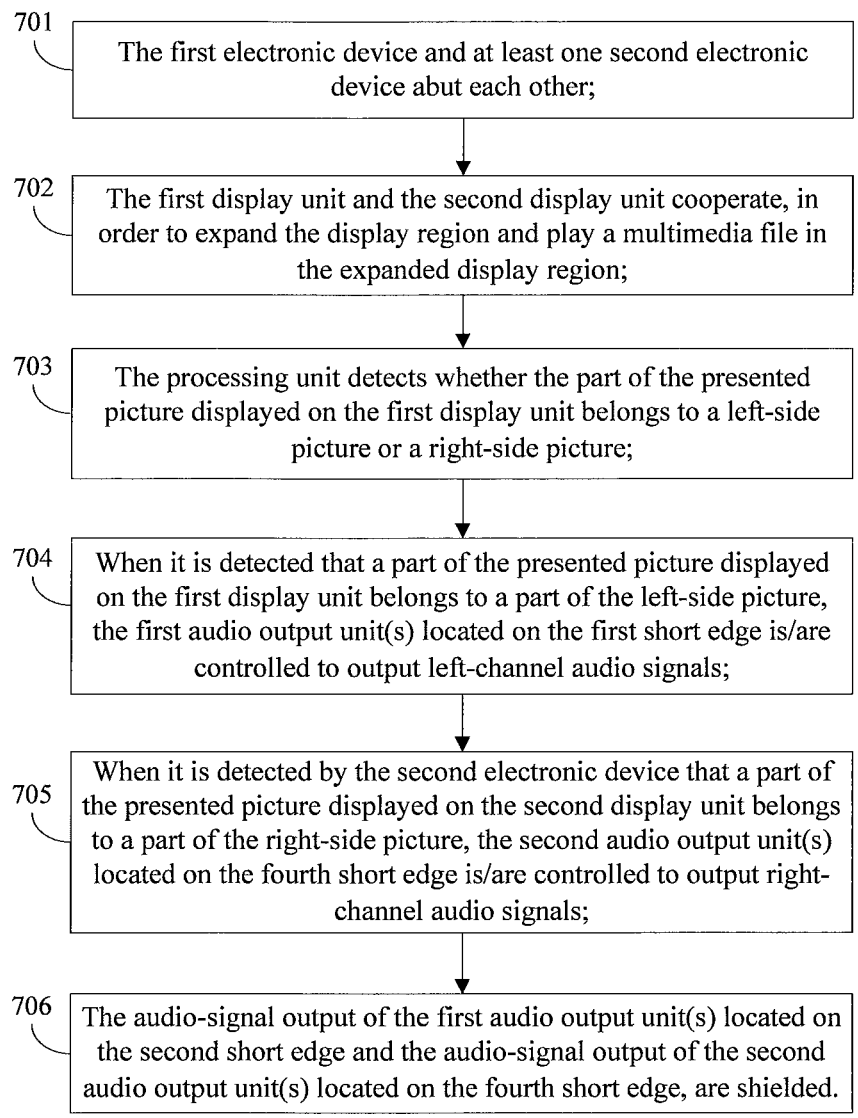
FIG. 18 is a flowchart of an information processing method in accordance with Embodiment 4 of the present invention.

FIG. 18 is a flowchart of an information processing method in accordance with Embodiment 4 of the present invention. As shown in FIG. 18, the method comprises the steps as follows:

701: The first electronic device and at least one second electronic device abut each other;

702: The first display unit and the second display unit cooperate, in order to expand the display region and play a multimedia file in the expanded display region;

703: The processing unit detects whether the part of the presented picture displayed on the first display unit belongs to a left-side picture or a right-side picture;

704: When it is detected that a part of the presented picture displayed on the first display unit belongs to a part of the left-side picture, the first audio output unit(s) located on the first short edge is/are controlled to output left-channel audio signals;

705: When it is detected by the second electronic device that a part of the presented picture displayed on the second display unit belongs to a part of the right-side picture, the second audio output unit(s) located on the fourth short edge is/are controlled to output right-channel audio signals;

706: The audio-signal output of the first audio output unit(s) located on the second short edge and the audio-signal output of the second audio output unit(s) located on the fourth short edge are shielded.

The audio-signal output of the first audio output unit(s) located on the second short edge may be shielded by the first electronic device, and the audio-signal output of the second audio output unit(s) located on the fourth short edge may be shielded by the second electronic device.

Embodiment 5

In this embodiment, the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon; the first electronic device and the second electronic device are tiled to each other with the second long edge and the third long edge; moreover, the first display unit displays left-side pictures of a video image, and the second display unit displays right-side pictures of the video image. This embodiment corresponds to the case, as shown in FIG. 13, that the second long edge A2 of the first electronic device 201 and the third long edge A3 of the second electronic device 202 abut against each other.

Figure 19:
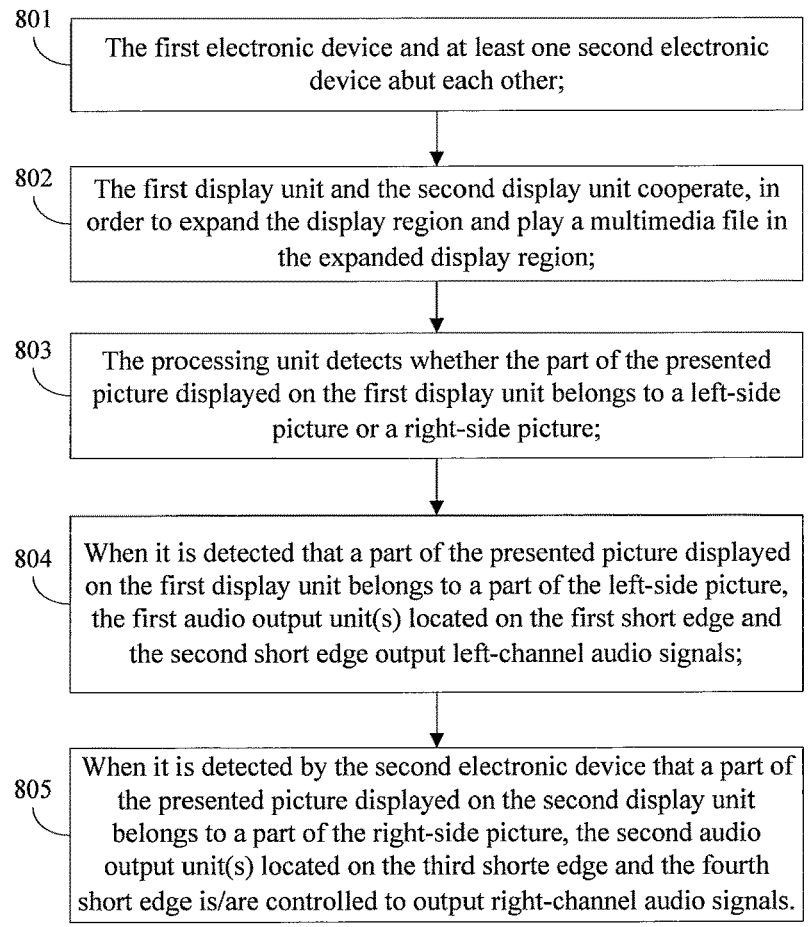
FIG. 19 is a flowchart of an information processing method in accordance with Embodiment 5 of the present invention.

FIG. 19 is a flowchart of an information processing method in accordance with Embodiment 5 of the present invention As shown in FIG. 19, the method comprises the steps as follows:

801: The first electronic device and at least one second electronic device abut each other;

802: The first display unit and the second display unit cooperate, in order to expand the display region and play a multimedia file in the expanded display region;

803: The processing unit detects whether the part of the presented picture displayed on the first display unit belongs to a left-side picture or a right-side picture;

804: When it is detected that a part of the presented picture displayed on the first display unit belongs to a part of the left-side picture, the first audio output unit(s) located on the first short edge and the second short edge output left-channel audio signals;

805: When it is detected by the second electronic device that a part of the presented picture displayed on the second display unit belongs to a part of the right-side picture, the second audio output unit(s) located on the third short edge and the fourth short edge is/are controlled to output right-channel audio signals.

Embodiment 6

Figure 20:
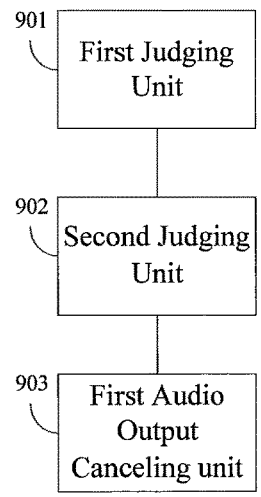
FIG. 20 is a structural diagram of an electronic device in accordance with Embodiment 6 of the present invention.

FIG. 20 is a structural diagram of an electronic device in accordance with Embodiment 6 of the present invention. As shown in FIG. 20, the electronic device further comprises:

A first judging unit 901, used to judge whether or not any one of the plurality of edges of the first electronic device abut the second display unit of the second device;

A second judging unit 902, used to: further judge whether or not the one or more edges abutting the second display unit are provided with the first audio output unit(s) thereon, when the judgment result of the first judging unit is YES;

A first audio output canceling unit 903, used to: cancel the audio output of the first audio output unit(s) provided on the one or more edges abutting the second display unit, when the judgment result of the second judging unit is YES.

Specifically, it corresponds to an application case, as shown in FIG. 14, where the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon.

The first audio output canceling unit 903, may comprise:

Second-short-edge first audio output canceling sub-unit, used to: cancel the audio output of the first audio output unit(s) provided on the second short edge, when the first electronic device and the second electronic device are tiled to each other with the second short edge and the third short edge, The electronic device may further comprise:

Second audio output canceling unit, used to: cancel the audio output of the second audio output unit(s) provided on the third short edge.

In the electronic device according to this embodiment, it is judged whether or not one of the plurality of edges of the first electronic device abuts the second display unit of the second device; if YES, then it is further judged whether or not the one or more edges abutting the second display unit are provided with the first audio output unit(s) thereon; if YES, then the audio output of the first audio output unit(s) provided on the one or more edges abutting the second display unit is cancelled; in this way, when a plurality of electronic devices play a video file together, it can prevent the sound output by the audio output unit(s) at the abutting places from affecting user experience, whereas the audio output unit(s) at non-abutting places can output audio, thereby enhancing user's listening experience.

Embodiment 7

Figure 21:
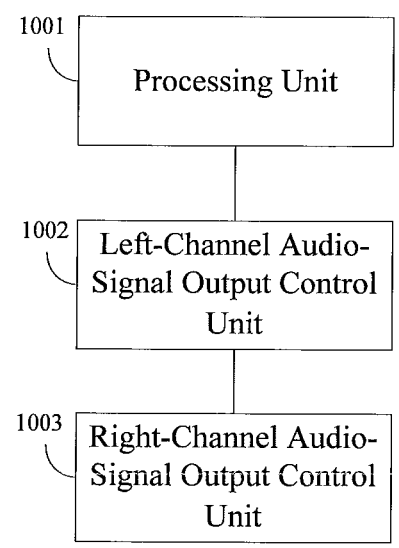
FIG. 21 is a structural diagram of an electronic device in accordance with Embodiment 7 of the present invention.

FIG. 21 is a structural diagram of an electronic device in accordance with Embodiment 7 of the present invention. As shown in FIG. 21, the electronic device may comprise:

A processing unit 1001, used to: detect whether the part of the presented picture displayed on the first display unit belongs to the left-side picture or the right-side picture;

A left-channel audio-signal output control unit 1002, used to: control at least one of the plurality of first audio output units to output left-channel audio signals, when a part of the presented picture displayed on the first display unit belongs to a part of the left-side picture;

A right-channel audio-signal output control unit 1003, used to: control at least one of the plurality of first audio output units to output right-channel audio signals, when a part of the presented picture displayed on the first display unit belongs to a part of the right-side picture.

Specifically, it corresponds to an application case, as shown in FIG. 15, where the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon.

The left-channel audio-signal output control unit 1002 may comprise:

First-short-edge first-audio output canceling sub-unit, used to: control the first audio output unit(s) located on the first short edge to output left-channel audio signals, when the first display unit displays left-side pictures of a video image, and the second display unit displays right-side pictures of the video image;

The second electronic device may further comprise:

Fourth-short-edge second-audio output canceling unit, used to: control the second audio output unit(s) located on the fourth short edge to output right-channel audio signals, when the first display unit displays left-side pictures of a video image, and the second display unit displays right-side pictures of the video image;

The first electronic device may further comprise: a shielding unit, used to: shield the audio-signal output of the first audio output unit(s) located on the second short edge and the audio-signal output of the second audio output unit(s) located on the third short edge.

It corresponds to an application case, as shown in FIG. 13, where the first electronic device has a first long edge, a second long edge, a first short edge and a second short edge, both the first short edge and the second short edge being provided with the first audio output unit(s) thereon; the second electronic device has a third long edge, a fourth long edge, a third short edge and a fourth short edge, both the third short edge and the fourth short edge being provided with the second audio output unit(s) thereon; when the first electronic device and the second electronic device are tiled to each other with the second long edge and the third long edge.

The left-channel audio-signal output control unit 1002, may comprise:

First audio output control sub-unit, used to: control the first audio output unit(s) located on the first short edge and the second short edge to output left-channel audio signals, when the first display unit displays left-side pictures of a video image, and the second display unit displays right-side pictures of the video image;

The second electronic device may further comprise:

Second audio output control unit, used to: control the second audio output unit(s) located on the third short edge and the fourth short edge to output right-channel audio signals, when the first display unit displays left-side pictures of a video image, and the second display unit displays right-side pictures of the video image.

In the electronic device according to this embodiment, it is detected whether the part of the presented picture displayed on the first display unit belongs to the left-side picture or the right-side picture; when the first display unit displays a part of the left-side picture, the first audio output unit(s) are controlled to output left-channel audio signals, and when the first display unit displays a part of the right-side picture, the first audio output unit(s) are controlled to output right-channel audio signals; in this way, it is achieved that, the audio output units of the electronic devices used in combination can be controlled, and output proper audio signals in accordance with the pictures displayed by the display units of the electronic devices.

<The Third Embodiment>

Figure 22:
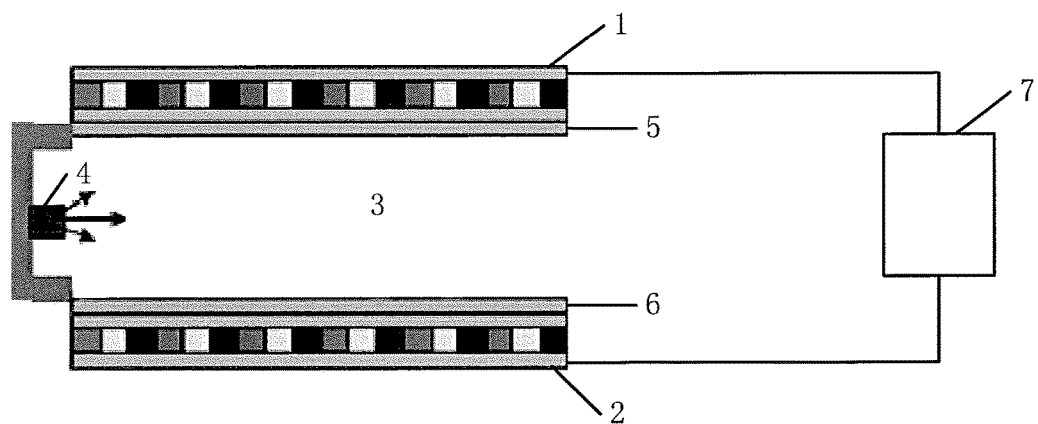
FIG. 22 is a schematic diagram illustrating the display screen portion of an electronic device in accordance with a third embodiment of the present invention.

Below, with reference to FIG. 22, an electronic device in accordance with an embodiment of the present invention will be described. FIG. 22 is a schematic diagram illustrating the display screen portion of an electronic device in accordance with the third embodiment of the present invention. Here, the electronic device in accordance with this embodiment of the invention may be such an electronic device as a flip phone, a notebook computer, or a Tablet PC, etc. For example, in the case that the electronic device may be a flip phone, dual display screens equipped on the electronic device may be: an inner display screen (main display screen) and an outer display screen (auxiliary display screen) of the electronic equipment, respectively. In addition, in the case that the electronic device is a notebook computer, dual display screens equipped on the electronic device may be: an inner display screen at the front of the display housing of the electronic device, and an outer display screen at the back of the display housing, respectively. In addition, in the case that the electronic device is a Tablet PC, dual display screens equipped on the electronic device may be: a main display screen at the front of the electronic device, and an auxiliary display screen at the back, respectively.

As shown in FIG. 22, the electronic device in accordance with the third embodiment of the invention may comprise: a first liquid crystal display panel 1, a second liquid crystal display panel 2, a cavity 3, a light source 4, a first collimating-reflective polarizer film 5, a second collimating-reflective polarizer film 6 and a control unit 7.

The first liquid crystal display panel 1 may be implemented by any type of liquid crystal display panel (such as TN, TFT, IPS, ASV, etc.), and can be used as an outer display screen (auxiliary display screen) of an electronic device.

The second liquid crystal display panel 2 may be implemented by any type of liquid crystal display panel (such as TN, TFT, IPS, ASV, etc.), and can be used as an inner display screen (main screen) of an electronic device. The second liquid crystal display panel 2 is provided opposite to the first liquid crystal display panel 1, that is, the light incident surfaces (backlight receiving surfaces) of the first liquid crystal display panel 1 and the second liquid crystal display panel 2 are opposed to each other. Here, it should be noted that, although the first liquid crystal display panel 1 and the second liquid crystal display panel 2 shown in FIG. 22 has the same size, the first liquid crystal display panel 1 and the second liquid crystal display panel 2 may have different sizes. For example, the second liquid crystal display panel 2 (main display screen) may have a larger area.

According to this embodiment of the invention, a cavity 3 having a preset height is between the first liquid crystal display panel 1 and the second liquid crystal display panel 2, and the cavity 3 can be used to transmit light from the light source 4. Here, the area of the cavity 3 is at least greater than the area of the larger one of the first liquid crystal display panel 1 and the second liquid crystal display panel 2, so that the light can reach the entire display regions of the first liquid crystal display panel 1 and the second liquid crystal display panel 2. In addition, the thickness of the cavity 3 may be very small, for example, 1-3 mm.

The light source 4 may be provided on one side of the cavity, and may be made of any LED lights; the light source 4 can emit light to form background light of the first liquid crystal display panel 1 and the second liquid crystal display panel 2. Here, the light source 4 may be provided in a region of the cavity projecting with respect to the first liquid crystal display panel 1 and the second liquid crystal display panel 2, so as to avoid the light source 4 directly radiating the first liquid crystal display panel 1 and the second liquid crystal display panel 2, which otherwise will result in that the first liquid crystal display panel 1 and the second liquid crystal display panel 2 are partially too bright. However, the present invention is not limited thereto, and since the light source 4 is used to provide background light for the first liquid crystal display panel 1 and the second liquid crystal display panel 2, the light source 4 may be provided at any position within the cavity 3, and may have any shape (such as, strip, dot, etc.), provided that the light emitted by the light source 4 is substantially uniformly distributed within the cavity 3.

The first collimating-reflective polarizer film 5 may be provided on the light incident surface (the surface facing the cavity 3) of the first liquid crystal display panel 1, and can be implemented by any collimating-reflective polarizer film. The first collimating-reflective polarizer film 5 can make the light emitted from the light source 4 uniformly scattered (distributed) within the cavity 3.

The second collimating-reflective polarizer film 6 may be provided on the light incident surface (the surface facing the cavity 3) of the second liquid crystal display panel 2, and can be implemented by any collimating-reflective polarizer film. The second collimating-reflective polarizer film 6 can make the light emitted from the light source 4 uniformly scattered (distributed) within the cavity 3. Here, specifically, because the first collimating-reflective polarizer film 5 and the second collimating-reflective polarizer film 6 allow light at a predetermined angle to pass through the first collimating-reflective polarizer film 5 and the second collimating-reflective polarizer film 6 whereas reflect other light, the first collimating-reflective polarizer film 5 and the second collimating-reflective polarizer film 6 can implement diffuse reflection of light, so that the light emitted by the light source 4 are relatively uniformly distributed within the cavity 3.

The control unit 7 may be implemented by any processor, or microprocessor. Here, the control unit 7 may be a processing unit or a graphic processing unit of the electronic device. According to the embodiment of the invention, the control unit 7 can receive display-mode control signals, and based on the display-mode control signals, control displays of the first liquid crystal display panel 1 and the second liquid crystal display panel 2. Here, the display-mode control signals may be sent to the control unit 7 by a predefined button (e.g., display-mode switching button) on the electronic device. In addition, the display-mode control signals also may be sent by a preset program (e.g., display-mode switching program or function) on the electronic device, so that the control unit 7 is based on the display-mode control signals to control the first liquid crystal display panel 1 and the second liquid crystal display panel 2.

Here, if the display-mode control signals received by the control unit 7 indicate that only the first liquid crystal display panel 1 needs to display pictures, then the control unit 7 can turn off the display of the second liquid crystal display panel 2. Specifically, in the case that the second liquid crystal display panel 2 is a normal-white liquid crystal display panel (its liquid crystal layer is in a transparent state when power off), if the display-mode control signals indicate that only the first liquid crystal display panel 1 needs to display pictures, then the control unit 7 provides a full-black signal to the second liquid crystal display unit 2. In this case, because the second liquid crystal display unit 2 is based on the full-black signal to display black, that is, the liquid crystal layer of the second liquid crystal display unit 2 is not transmitting light, the light emitted from the light source 4 and uniformly scattered within the cavity 3 will not pass through the second liquid crystal display unit 2. Therefore, as the electronic device displays pictures through the first liquid crystal display panel 1, a user will not see any picture present on the second liquid crystal display panel 2 of the electronic device or any light passing through the second liquid crystal display panel 2. In addition, in the case that the second liquid crystal display panel 2 is a normal-black liquid crystal display panel (its liquid crystal layer is in an opaque state when power off), if the display-mode control signals indicate that only the first liquid crystal display panel 1 needs to display pictures, then the control unit 7 can interrupt the power supply of the second liquid crystal display unit 2. In this case, the light emitted from the light source 4 and uniformly scattered within the cavity 3 will not pass through the second liquid crystal display unit 2; therefore, as the electronic device displays pictures through the first liquid crystal display panel 1, a user will not see any picture present on the second liquid crystal display panel 2 of the electronic device or any light passing through the second liquid crystal display panel 2.

Similarly, if the display-mode control signals received by the control unit 7 indicate that only the second liquid crystal display panel 2 needs to display pictures, then the control unit 7 can turn off the display of the first liquid crystal display panel 1. Specifically, in the case that the first liquid crystal display panel 1 is a normal-white liquid crystal display panel (its liquid crystal layer is in a transparent state when power off), if the display-mode control signals indicate that only the second liquid crystal display panel 2 needs to display pictures, then the control unit 7 provides a full-black signal to the first liquid crystal display unit 1. In this case, the liquid crystal layer of the first liquid crystal display unit 1 is not transmitting light, therefore, as the electronic device displays pictures through the second liquid crystal display panel 2, a user will not see any picture present on the first liquid crystal display panel 1 of the electronic device or any light passing through the first liquid crystal display panel 1. In addition, in the case that the first liquid crystal display panel 1 is a normal-black liquid crystal display panel (its liquid crystal layer is in an opaque state when power off), if the display-mode control signals indicate that only the second liquid crystal display panel 2 needs to display pictures, then the control unit 7 can interrupt the power supply of the first liquid crystal display unit 1. In this case, the light emitted from the light source 4 and uniformly scattered within the cavity 3 will not pass through the first liquid crystal display unit 1; therefore, as the electronic device displays pictures through the second liquid crystal display panel 2, a user will not see any picture present on the first liquid crystal display panel 1 of the electronic device or any light passing through the first liquid crystal display panel 1.

In addition, if the display-mode control signals received by the control unit 7 indicate that both the first liquid crystal display panel 1 and the second liquid crystal display panel 2 need to display pictures simultaneously, then the control unit 7 can provide normal images or video signals to the first liquid crystal display panel 1 and the second liquid crystal display panel 2, that is, the control unit 7 does not perform a special control (e.g., a full-black signal or a power off) to the first liquid crystal display panel 1 and the second liquid crystal display panel 2, so that the light emitted from the light source 4 and uniformly scattered within the cavity 3 is used as the backlight of the first liquid crystal display panel 1 and the second liquid crystal display panel 2.

Figure 23:
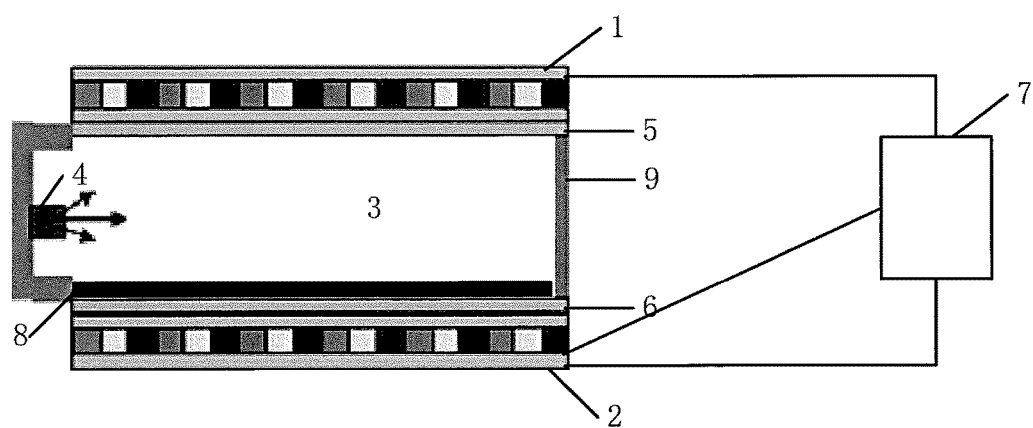
FIG. 23 is a schematic diagram illustrating the display screen portion of an electronic device in accordance with a fourth embodiment of the present invention.

The above is a description of the electronic device in accordance with the third embodiment of the invention. Below, an electronic device in accordance with a fourth embodiment of the present invention will be described. FIG. 23 is a schematic diagram illustrating the display screen portion of an electronic device in accordance with a fourth embodiment of the present invention. Here, compared to the electronic device shown in FIG. 22, the electronic device shown in FIG. 23 may further comprise a reflective sheet 8 and a displacement sensor 9.

As shown in FIG. 23, the reflective sheet 8 may be made of any reflective material with high reflectivity. Here, because the reflective sheet 8 may be made of any reflective material with high reflectivity, both the upper surface and the lower surface of the reflective sheet 8 can reflect light. The reflective sheet 8 may be provided within the cavity 3, and able to move in a reciprocating manner along a thickness direction (i.e., move in a reciprocating manner along a vertical direction of FIG. 23) of the cavity 3. Here, the area of the reflective sheet 8 may be greater than or equal to the area of the first liquid crystal display unit 1 and/or the second liquid crystal display unit 2, so that the reflective sheet 8 can effectively reflect the light from the light source 4 to the first liquid crystal display unit 1 and the second liquid crystal display unit 2. Preferably, the area of the reflective sheet 8 may be greater than or equal to the area of the larger one of the first liquid crystal display unit 1 and the second liquid crystal display unit 2.

The displacement sensor 9 may be provided at one side of the cavity 3 (e.g., on the inner wall of the cavity) away from the light source 4, and is connected with the reflective sheet 8. The displacement sensor 9 may be implemented by any movable mechanism, and may be based on the control signals of the control unit 7 to move the reflective sheet 8 along a thickness direction of the cavity 3.

Specifically, the control unit 7 can receive display-mode control signals, and based on the display-mode control signals, control displays of the first liquid crystal display panel 1 and the second liquid crystal display panel 2. Here, the display-mode control signals may be sent to the control unit 7 by a predefined button (e.g., display-mode switching button) on the electronic device. In addition, the display-mode control signals also may be sent by a preset program (e.g., display-mode switching program or function) on the electronic device.

Figure 24A:
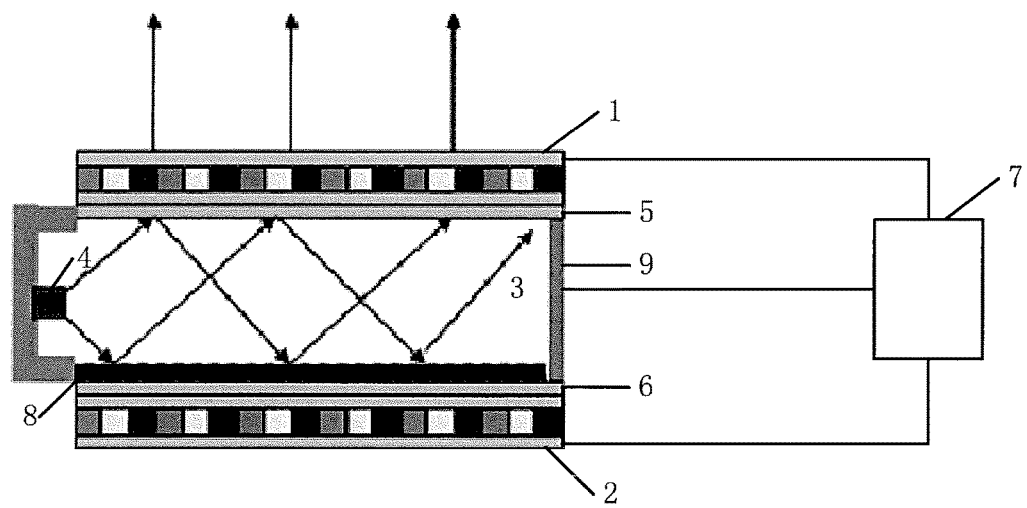
FIGS. 24A-C are schematic diagrams illustrating different display modes of an electronic device in accordance with the fourth embodiment of the present invention.

Here, as shown in FIG. 24A, if the display-mode control signals received by the control unit 7 indicate that only the first liquid crystal display panel 1 needs to display pictures, then the control unit 7 can turn off the display of the second liquid crystal display panel 2. Specifically, as the display-mode control signals indicate that only the first liquid crystal display panel 1 needs to display pictures, the control unit 7 can control the displacement sensor 9 to move reflective sheet 8, so that the reflective sheet 8 superimposes on the second liquid crystal display panel 2. In this case, because the reflective sheet 8 superimposes on the second liquid crystal display panel 2 (i.e., the reflective sheet 8 blocks the second liquid crystal display panel 2), the reflective sheet 8 will reflect the light (backlight) radiated on the second liquid crystal display panel 2 toward the first liquid crystal display panel 1 side; thus, the second liquid crystal display panel 2 can not obtain the light (backlight) from the light source 4. At this time, the control unit 7 can interrupt the power supply of the second liquid crystal display panel 2 and do not provide image or video signals to the second liquid crystal display panel 2.

Figure 24B:
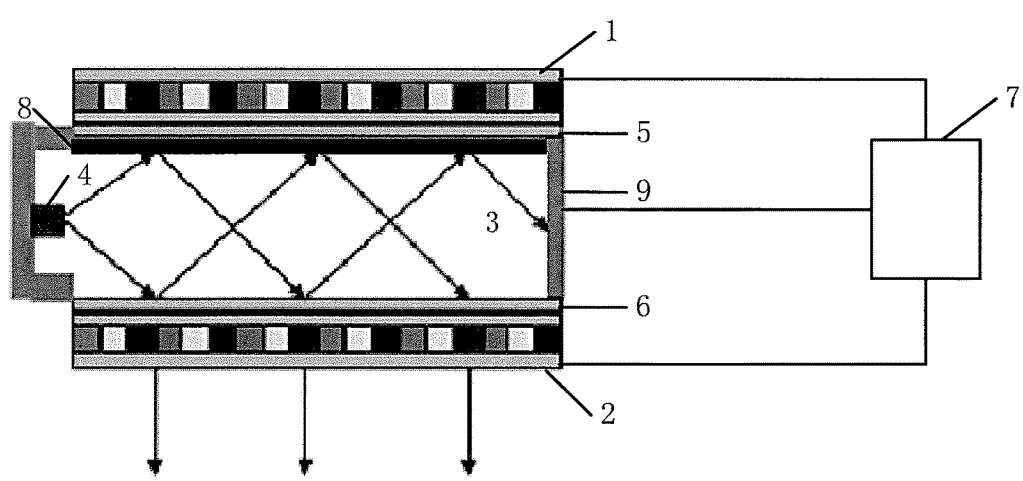

Further, as shown in FIG. 24B, if the display-mode control signals received by the control unit 7 indicate that only the second liquid crystal display panel 2 needs to display pictures, then the control unit 7 can turn off the display of the first liquid crystal display panel 1. Specifically, as the display-mode control signals indicate that only the second liquid crystal display panel 2 needs to display pictures, the control unit 7 can control the displacement sensor 9 to move reflective sheet 8, so that the reflective sheet 8 superimposes on the first liquid crystal display panel 1. In this case, because the reflective sheet 8 superimposes on the first liquid crystal display panel 1 (i.e., the reflective sheet 8 blocks the first liquid crystal display panel 1), the reflective sheet 8 will reflect the light (backlight) radiated on the first liquid crystal display panel 1 toward the second liquid crystal display panel 2 side; thus, the first liquid crystal display panel 1 can not obtain the light (backlight) from the light source 4. At this time, the control unit 7 can interrupt the power supply of the first liquid crystal display panel 1 and do not provide image or video signals to the first liquid crystal display panel 1.

Figure 24C:
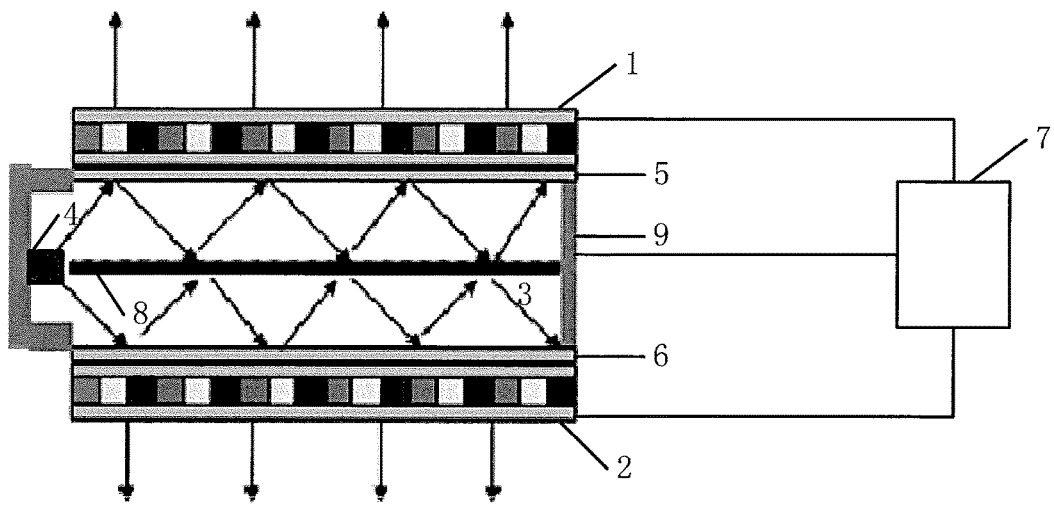

In addition, as shown in FIG. 24C, in the case that the display-mode control signals indicate that both the first liquid crystal display panel 1 and the second liquid crystal display panel 2 need to display pictures simultaneously, the control unit 7 controls the displacement sensor 9 to move the reflective sheet 8, so that the reflective sheet 8 is moved to an intermediate portion of the cavity 3. In this case, because the reflective sheet 8 is located at the intermediate portion of the cavity 3, and because both the upper surface and the lower surface of the reflective sheet 8 can reflect light, both the first liquid crystal display panel 1 and the second liquid crystal display panel 2 can obtain backlight. At this time, the control unit 7 can provide normal image or a video signals to the first liquid crystal display panel 1 and the second liquid crystal display panel 2, so that the light emitted from the light source 4 and uniformly scattered within the cavity 3 can be used as the backlight of the first liquid crystal display panel 1 and the second liquid crystal display panel 2 for providing images or videos to users.

With the above configuration, the two liquid crystal display panels of the electronic device in accordance with the embodiment of the invention use only one set of light source (light source 4), and light is transmitted through the cavity; therefore, compared with the case in the prior art where two liquid crystal display panels in an electronic device use two sets of light source and backlight systems, the electronic device in accordance with the embodiment of the invention can achieve a smaller thickness (very thin) and a lower cost, and can significantly reduce the weight of the electronic device. Further, by controlling the displays of the two liquid crystal display panels based on the display-mode control signals, it is easy to switch between a display mode using a single liquid crystal display panel from the two liquid crystal display panels and a display mode using both of the two liquid crystal display panels simultaneously.

Figure 25:
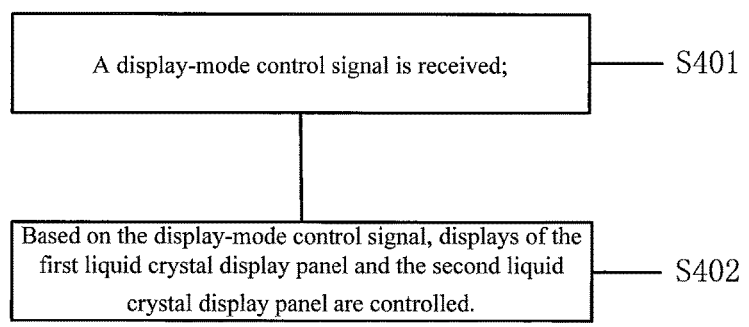
FIG. 25 is a flowchart illustrating a display control method in accordance with an embodiment of the present invention.

The above is a description of the terminal device in accordance with the present invention. Below, with reference to FIG. 25, a display control method in accordance with an embodiment of the present invention will be described. FIG. 25 is a flowchart illustrating a display control method in accordance with an embodiment of the present invention. The method shown in FIG. 25 can be applied to a terminal device in accordance with the embodiment of the present invention. Here, the terminal device in accordance with the embodiment of the present invention may comprise: a first liquid crystal display panel; a second liquid crystal display panel, provided opposite to the first liquid crystal display panel; a cavity having a preset height between the first liquid crystal display panel and the second liquid crystal display panel; a light source provided at one side of the cavity; a first collimating-reflective polarizer film, provided on a first surface of the first liquid crystal display panel, and configured to make the light emitted by the light source uniformly scattered within the cavity; a second collimating-reflective polarizer film, provided on a second surface of the second liquid crystal display panel, and configured to make the light emitted by the light source uniformly scattered within the cavity. Here, the first surface and the second surface are the light incident surfaces of the first liquid crystal display panel and the second liquid crystal display panel, respectively As shown in FIG. 25, in step S401, display-mode control signals are received.

Specifically, the display-mode control signals may be sent to the control unit 7 by a predefined button (e.g., display-mode switching button) on the electronic device. In addition, the display-mode control signals also may be sent by a preset program (e.g., display-mode switching program or function) on the electronic device. In this case, the control unit 7 can receive display-mode control signals.

Then, in step S402, it is based on the display-mode control signals to control the displays of the first liquid crystal display panel and the second liquid crystal display panel.

Specifically, according to an embodiment of the present invention, similar to the description for FIG. 22, if the display-mode control signals received by the control unit 7 indicate that only the first liquid crystal display panel 1 needs to display pictures, then the control unit 7 can turn off the display of the second liquid crystal display panel 2. Specifically, in the case that the second liquid crystal display panel 2 is a normal-white liquid crystal display panel (its liquid crystal layer is in a transparent state when power off), the control unit 7 provides a full-black signal to the second liquid crystal display unit 2. In this case, the liquid crystal layer of the second liquid crystal display unit 2 is not transmitting light; therefore, as the terminal device displays pictures through the first liquid crystal display panel 1, a user will not see any picture present on the second liquid crystal display panel 2 of the terminal device or any light passing through the second liquid crystal display panel 2. In addition, in the case that the second liquid crystal display panel 2 is a normal-black liquid crystal display panel (its liquid crystal layer is in an opaque state when power off), the control unit 7 can interrupt the power supply of the second liquid crystal display unit 2. In this case, the light emitted from the light source 4 and uniformly scattered within the cavity 3 will not pass through the second liquid crystal display unit 2; therefore, as the terminal device displays pictures through the first liquid crystal display panel 1, a user will not see any picture present on the second liquid crystal display panel 2 of the terminal device or any light passing through the second liquid crystal display panel 2. Similarly, if the display-mode control signals received by the control unit 7 indicate that only the second liquid crystal display panel 2 needs to display pictures, then the control unit 7 can turn off the display of the first liquid crystal display panel 1. Specifically, in the case that the first liquid crystal display panel 1 is a normal-white liquid crystal display panel (its liquid crystal layer is in a transparent state when power off), the control unit 7 provides a full-black signal to the first liquid crystal display unit 1. In this case, as the terminal device displays pictures through the second liquid crystal display panel 2, a user will not see any picture present on the first liquid crystal display panel 1 of the terminal device or any light passing through the first liquid crystal display panel 1. In addition, in the case that the first liquid crystal display panel 1 is a normal-black liquid crystal display panel (its liquid crystal layer is in an opaque state when power off), the control unit 7 can interrupt the power supply of the first liquid crystal display unit 1. In this case, as the terminal device displays pictures through the second liquid crystal display panel 2, a user will not see any picture present on the first liquid crystal display panel 1 of the terminal device or any light passing through the first liquid crystal display panel 1. In addition, if the display-mode control signals received by the control unit 7 indicate that both the first liquid crystal display panel 1 and the second liquid crystal display panel 2 need to display pictures simultaneously, then the control unit 7 can provide normal images or video signals to the first liquid crystal display panel 1 and the second liquid crystal display panel 2, that is, the control unit 7 does not perform a special control (e.g., a full-black signal or a power off) to the first liquid crystal display panel 1 and the second liquid crystal display panel 2, so that the light emitted from the light source 4 and uniformly scattered within the cavity 3 is used as the backlight of the first liquid crystal display panel 1 and the second liquid crystal display panel 2.

In addition, according to another embodiment of the present invention, similar to the description for FIG. 23, the terminal device may further comprise a reflective sheet 8 and a displacement sensor 9. The reflective sheet 8 is provided within the cavity 3, and able to move in a reciprocating manner along a thickness direction of the cavity 3. Preferably, the area of the reflective sheet 8 may be greater than or equal to the area of the larger one of the first liquid crystal display unit 1 and the second liquid crystal display unit 2. The displacement sensor 9 may be provided at one side of the cavity 3 away from the light source 4, and is connected with the reflective sheet 8. The displacement sensor 9 may be based on the control signals of the control unit 7 to move the reflective sheet 8 along a thickness direction of the cavity 3.

In this case, if the display-mode control signals received by the control unit 7 indicate that only the first liquid crystal display panel 1 needs to display pictures, then the control unit 7 can control the displacement sensor 9 to move reflective sheet 8, so that the reflective sheet 8 superimposes on the second liquid crystal display panel 2. In this case, because the reflective sheet 8 superimposes on the second liquid crystal display panel 2 (i.e., the reflective sheet 8 blocks the second liquid crystal display panel 2), the reflective sheet 8 will reflect the light (backlight) radiated on the second liquid crystal display panel 2 toward the first liquid crystal display panel 1 side; thus, the second liquid crystal display panel 2 can not obtain the light (backlight) from the light source 4. At this time, the control unit 7 can interrupt the power supply of the second liquid crystal display panel 2 and do not provide image or video signals to the second liquid crystal display panel 2. In addition, if the display-mode control signals received by the control unit 7 indicate that only the second liquid crystal display panel 2 needs to display pictures, then the control unit 7 can control the displacement sensor 9 to move reflective sheet 8, so that the reflective sheet 8 superimposes on the first liquid crystal display panel 1. In this case, because the reflective sheet 8 superimposes on the first liquid crystal display panel 1 (i.e., the reflective sheet 8 blocks the first liquid crystal display panel 1), the reflective sheet 8 will reflect the light (backlight) radiated on the first liquid crystal display panel 1 toward the second liquid crystal display panel 2 side; thus, the first liquid crystal display panel 1 can not obtain the light (backlight) from the light source 4. At this time, the control unit 7 can interrupt the power supply of the first liquid crystal display panel 1 and do not provide image or video signals to the first liquid crystal display panel 1. In addition, in the case that the display-mode control signals indicate that both the first liquid crystal display panel 1 and the second liquid crystal display panel 2 need to display pictures simultaneously, the control unit 7 controls the displacement sensor 9 to move the reflective sheet 8, so that the reflective sheet 8 is moved to an intermediate portion of the cavity 3. In this case, because the reflective sheet 8 is located at the intermediate portion of the cavity 3, and because both the upper surface and the lower surface of the reflective sheet 8 can reflect light, both the first liquid crystal display panel 1 and the second liquid crystal display panel 2 can obtain backlight. At this time, the control unit 7 can provide normal image or a video signals to the first liquid crystal display panel 1 and the second liquid crystal display panel 2, so that the light emitted from the light source 4 and uniformly scattered within the cavity 3 can be used as the backlight of the first liquid crystal display panel 1 and the second liquid crystal display panel 2 for providing images or videos to users.

It should be noted that, in this specification, the terms "comprises", "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. In the case of no more restricted, by the statement "comprises a . . . " defining elements, does not preclude the existence of additional identical elements including the elements of the process, method, article or device.

Finally, it should be noted that, the above series of processes comprise not only processing performed in time series in the order described herein, but also comprises processing executed in parallel or separately, instead of the in chronological order.

Through the above description of the embodiments, the skilled in the art can clearly understand that, the present invention can be implemented by software plus a necessary hardware platform; certainly, it can also be implemented entirely by hardware. Based on such understanding, all or a portion of the contribute of the technical solution of the present invention to the background art, may be embodied in the form of a software product, the computer software product may be stored in a storage medium, such as a ROM/RAM, disk, optical disk, etc., and comprises a plurality of instructions for a method that allows a computer device (may be a personal computer, server, or network equipment, etc.) to perform various embodiments of the present invention or some portion of the embodiment.

The above has described the present invention in detail, and specific examples of the principles of the invention and embodiments are described herein; the above description of the embodiments is only used to help the understanding of the method and the core idea of the present invention; Meanwhile, for the ordinary skilled in the art, based on the idea of the invention, there will be variations at both the specific embodiments and application ranges; in summary, the content of the this specification should not be understood as limiting the present invention.

The invention claimed is:

1. A display method, applied in a plurality of electronic devices, the plurality of electronic devices comprising at least a first electronic device and a second electronic device, wherein, the first electronic device comprises a first display unit having a plurality of edges, and the second electronic device comprises a second display unit also having a plurality of edges, the method comprising:

the first electronic device and the second electronic device are tiled and placed in alignment, with a first edge of the plurality of edges of the first display unit as a first tiling shaft;

a predetermined display content is displayed on the first display unit and the second display unit after tiling, wherein, a first display content is displayed on the first display unit, and a second display content is displayed on the second display unit; both the first display content and the second display content are parts of the predetermined display content, moreover, the first display content and the second display content are tiled at the first tiling shaft into the predetermined display content;

when the first electronic device and/or the second electronic device is/are changed in position and re-tiled, a second edge of the plurality of edges of the first display unit is re-determined as a second tiling shaft; and according to the re-determined second tiling shaft, a third display content is displayed on the first display unit, and a fourth display content is displayed on the second display unit, wherein, both the third display content and the fourth display content are parts of the predetermined display content, moreover, the third display content and the fourth display content are tiled at the second tiling shaft into the predetermined display content, wherein an edge to be a tiling shaft is determined by proximate-edge sensors provided on every edge of the first display unit and the second display unit, and the proximate-edge sensors comprise Hall elements and magnets and after a proximate edge is determined as a tiling shaft by proximate-edge sensors, the first electronic device and the second electronic device implement calculation and control, respectively, so that the predetermined display content is divided according to a predefined rule, and displayed on the first display unit and the second display unit, respectively, thereby tiling into a complete predetermined display content, wherein the ratio of the first display content and the second display content is different from the ratio of the third display content and the fourth display content.

2. The method according to claim 1, wherein the first edge and the second edge are the same edge.

3. The method according to claim 2, wherein, the third display content is the same as the first display content, and the fourth display content is the same as the second display content; moreover, the third display content and the fourth display content have the same display direction with respect to the first electronic device and the second electronic device.

4. The method according to claim 2, wherein, the third display content is the same as the first display content, and the fourth display content is the same as the second display content; however, the fourth display content has a different display direction with respect to the second electronic device.

5. The method according to claim 2, wherein, the third display content is the same as the second display content, and the fourth display content is the same as the first display content; however, the third display content and the fourth display content have different display directions with respect to the first electronic device and the second electronic device, respectively.

6. The method according to claim 1, wherein the first edge and the second edge are different edges.

7. The method according to claim 6, wherein, the third display content is the same as the second display content, and the fourth display content is the same as the first display content; moreover, the third display content and the fourth display content have the same display direction with respect to the first electronic device and the second electronic device.

8. The method according to claim 6, wherein, the third display content is the same as the first display content, and the fourth display content is the same as the second display content; however, the third display content has a different display direction with respect to the first electronic device.

9. The method according to claim 6, wherein, the third display content is the same as the second display content, and the fourth display content is the same as the first display content; however, the fourth display content has a different display direction with respect to the second electronic device.

10. The method according to claim 6, wherein, the third display content is the same as the second display content, and the fourth display content is the same as the first display content; however, the third display content has a different display direction with respect to the first electronic device.

11. A display system, comprising:
- at least one first electronic device, wherein, the first electronic device comprises a first display unit having a plurality of edges and the first electronic device comprises a first control unit controlling the operation of the first electronic device;
- at least one second electronic device, wherein, the second electronic device comprises a second display unit also having a plurality of edges, and the second electronic device comprises a second control unit controlling the operation of the second electronic device;
- wherein, the first control unit and the second control unit are configured such that when one of the first electronic devices and one of the second electronic devices are tiled and placed in alignment, with a first edge of the plurality of edges of the first display unit as a first tiling shaft, a predetermined display content is displayed on the first display unit and the second display unit after tiling, wherein, a first display content is displayed on the first display unit, and a second display content is displayed on the second display unit; both the first display content and the second display content are parts of the predetermined display content, moreover, the first display content and the second display content are tiled at the first tiling shaft into the predetermined display content;
- when the first electronic device and/or the second electronic device is/are changed in position and re-tiled, a second edge of the plurality of edges of the first display unit is re-determined as a second tiling shaft; and
- according to the re-determined second tiling shaft, a third display content is displayed on the first display unit, and a fourth display content is displayed on the second display unit, wherein, both the third display content and the fourth display content are parts of the predetermined display content, moreover, the third display content and the fourth display content are tiled at the second tiling shaft into the predetermined display content,
- wherein an edge to be a tiling shaft is determined by proximate-edge sensors provided on every edge of the first display unit and the second display unit, and the proximate-edge sensors comprise Hall elements and magnets and after a proximate edge is determined as a tiling shaft by proximate-edge sensors, the first electronic device and the second electronic device implement calculation and control, respectively, so that the predetermined display content is divided according to a predefined rule, and displayed on the first display unit and the second display unit, respectively, thereby tiling into a complete predetermined display content, wherein the ratio of the first display content and the second display content is different from the ratio of the third display content and the fourth display content.

\* \* \* \* \*